United States Patent [19]

Weiss et al.

[11] Patent Number: 5,195,130
[45] Date of Patent: Mar. 16, 1993

[54] COMPUTER AND TELEPHONE APPARATUS WITH USER FRIENDLY COMPUTER INTERFACE AND ENHANCED INTEGRITY FEATURES

[75] Inventors: Lawrence D. Weiss, New York, N.Y.; Joseph C. Kawan, Hollywood, Calif.; Leslie Roth, Plainview, N.Y.; Jim R. Vollmer, Los Angeles, Calif.; Morris L. Tucci, Van Nuys, Calif.; Melvin M. Takata, Hermosa Beach, Calif.; Alfred S. Samulon, Malibu, Calif.; Dilip J. Parekh, Los Angeles, Calif.; Sarkis A. Meguerdijian, Glendale, Calif.; Harvey Marks, Canoga Park, Calif.; Shan Lee, Hacienda Heights, Calif.; Douglas W. Caruthers, Redondo, Calif.; Leo Ahlin, Rexdale, Canada; Leslie Moss, Los Angeles, Calif.; Kenneth Krieger, Northport, N.Y.; Carol A. Medine, Los Angeles, Calif.; Truc Nguyen, Cerritos, Calif.; Marjorie Engber, New York, N.Y.; Edward Chin, Dix Hills, N.Y.; Lucilla K. Warren, Los Angeles, Calif.; Joseph P. Randolph, Winchester, Mass.; Robert Haddock, New York, N.Y.

[73] Assignee: Transaction Technology, Inc., Santa Monica, Calif.

[21] Appl. No.: 593,921

[22] Filed: Oct. 5, 1990

Related U.S. Application Data

[63] Continuation-in-part of Ser. No. 260,832, Oct. 21, 1988, Pat. No. 5,008,927, which is a continuation-in-part of Ser. No. 190,440, May 5, 1988, Pat. No. 4,991,199, and Ser. No. 433,825, Nov. 9, 1989, and Ser. No. 439,739, Nov. 21, 1989.

[51] Int. Cl.⁵ .......................................... H04M 11/00
[52] U.S. Cl. .................................... 379/98; 379/90; 379/96; 375/13
[58] Field of Search .............. 379/90, 110, 93, 96–98, 379/357, 434; 375/13

[56] References Cited

U.S. PATENT DOCUMENTS

| | | |
|---|---|---|
| 3,760,375 | 9/1973 | Irwin et al. . |
| 3,865,994 | 2/1975 | Bender ................................. 379/110 |
| 3,932,709 | 1/1976 | Hoff et al. ............................ 379/96 |
| 3,995,123 | 11/1976 | Wilson ................................. 379/110 |
| 4,291,198 | 9/1981 | Anderson et al. ................... 379/354 |
| 4,381,427 | 4/1983 | Cheal et al. ........................... 379/93 |
| 4,431,870 | 2/1984 | May et al. . |
| 4,503,288 | 3/1985 | Kessler ................................. 379/96 |
| 4,532,378 | 7/1985 | Nakayama ........................... 379/110 |
| 4,533,791 | 8/1985 | Read et al. ............................ 379/96 |
| 4,578,537 | 3/1986 | Faggin et al. . |
| 4,580,011 | 4/1986 | Glaser . |
| 4,585,908 | 4/1986 | Smith . |

(List continued on next page.)

Primary Examiner—James L. Dwyer
Assistant Examiner—Wing F. Chan
Attorney, Agent, or Firm—Pennie & Edmonds

[57] ABSTRACT

The present invention relates to a telephone configured as a programmable microcomputer (telephone-computer) which operates in most circumstances through a standard telephone 12-key keypad input. The telephone-computer includes telephone electronics and a microprocessor unit operated in conjunction with other computer elements, including memory devices, and a programmable gate array (PGA) chip and enhanced integrity features, and has the overall appearance of a telephone. The PGA has the capability of being reconfigured to accommodate various types of softwares which require different hardware configuration, but without actually reconfiguring the hardware. The telephone-computer delivers data processing capabilities and services through an ordinary telephone instrument via conventional telephone lines with a network host computer which communicates with a vast panoply of service bureaus. Specifically, operating software is downloaded to the telephone-computer by the network host computer to reconfigure the PGA to format the microcomputer necessary to conform to the software format used by the service bureaus.

92 Claims, 20 Drawing Sheets

U.S. PATENT DOCUMENTS

| | | | |
|---|---|---|---|
| 4,607,144 | 8/1986 | Carmon et al. | 379/165 |
| 4,663,766 | 5/1987 | Bremer | 375/13 |
| 4,682,014 | 7/1987 | Iwama | 379/357 |
| 4,701,845 | 10/1987 | Andreasen et al. | |
| 4,724,521 | 2/1988 | Carron et al. | |
| 4,727,243 | 3/1988 | Savar | |
| 4,737,980 | 4/1988 | Curtin et al. | |
| 4,748,656 | 5/1988 | Gibbs et al. | 379/96 |
| 4,788,657 | 11/1988 | Douglas et al. | 379/98 |
| 4,852,151 | 7/1989 | Dittakavi et al. | 379/97 |
| 4,885,580 | 12/1989 | Noto et al. | 379/96 |
| 5,014,190 | 5/1991 | Johnson | |
| 5,018,189 | 5/1991 | Kurosawa et al. | |
| 5,020,100 | 5/1991 | Gardiner | |
| 5,027,315 | 6/1991 | Agrawal et al. | |
| 5,038,372 | 8/1991 | Elms et al. | |

FOREIGN PATENT DOCUMENTS

| | | | |
|---|---|---|---|
| 0085482 | 10/1987 | European Pat. Off. | |
| 2632106 | 1/1978 | Fed. Rep. of Germany | |
| 2632106 | 1/1978 | Fed. Rep. of Germany | |
| 2709461 | 9/1978 | Fed. Rep. of Germany | |
| 2709461 | 9/1978 | Fed. Rep. of Germany | |
| 3405448C2 | 11/1987 | Fed. Rep. of Germany | |
| 54-15606 | 2/1979 | Japan | 379/110 |
| 57-41723 | 3/1982 | Japan | 379/110 |
| 63-136758 | 6/1988 | Japan | 379/110 |
| 1324616 | 7/1973 | United Kingdom | |
| 1523691 | 9/1978 | United Kingdom | |
| 2128447 | 4/1984 | United Kingdom | |
| 2149946 | 6/1985 | United Kingdom | |
| 87/01256 | 2/1987 | World Int. Prop. O. | 379/96 |

OTHER PUBLICATIONS

Adkins, et al., "Displayphone: Telephone and Terminal Combine in a Compact Desk-Top Unit", Telesis (Bell Northern Research), 1982, pp. 2–7.

G. M. Durkin, "QWERTYphone-A Low-Cost Integrated Voice/Data Terminal", British Telecommunications Engineering, vol. 5, Jan. 1987, pp. 276–280.

CERMETEK, "A New Generation of Information Terminals", Apr. 23, 1987.

PCT Search Report, No. PCT/US 90/06517 citing the above-identified references.

Fike, et al., Understanding Telephone Electronics, 1989, Howard W. Sams & Company, pp. 119–150.

"CLASS Feature: Calling Number Delivery", Bellcore Technical Reference TR-SY-000031, Issue 2, Jun. 1988.

"SPCS Customer Premises Equipment Data Interface", Bellcore Technical Reference TR-SY000030, Issue 1, Nov. 1988.

Plessey Publication No. 7871/6 6/83 5M, "Plessey Vutel" (1983).

Plessey Publication No. 7952/1 9/1982 5M, "Plessey IBIS Videotex System" (1982).

Plessey Publication No. 8232 4/1987 5M, "Plessey MICROphone", (1987).

Japanese Publication vol. 6 No. 112(P-124) (990), Jun. 23, 1982, "Reset Preventing System of Microprocessor".

"Special Section: The Telephone Becomes an Information Terminal", May 1987, Computopia, p. 41.

Forbes, Jun. 26, 1989, entitled "This Things Has to Change People's Habits".

Patent Cooperation Treaty International Search Report, International Application No. PCT/US90/06517, filed Aug. 11, 1990.

IBM Technical Disclosure Bulletin, vol. 23, No. 9, Feb 1981 (Intelligent Telephone).

"Programmable Gate Array Data Book", Xilinx (1989), pp. 6–54 to 6–56.

Proceedings of the IEEE International Conference on Communications, "New Generation Microprocesso for Telecommunication Applications", S. Bal, Jun 8–12, pp. 11.5.1–11.5.4.

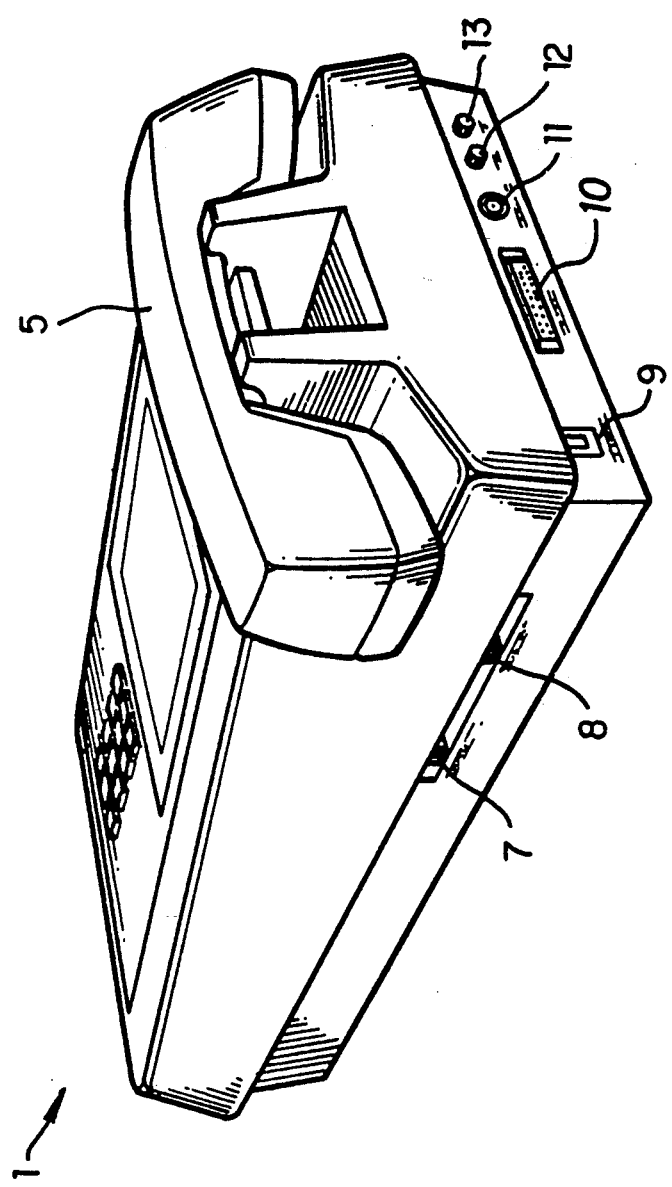

COMPUTER AND TELEPHONE APPARATUS WITH USER FRIENDLY COMPUTER INTERFACE AND ENHANCED INTEGRITY FEATURES

This application is a continuation-in-part of application Ser. No. 07/260,832, filed Oct. 21, 1988 U.S. Pat. No. 5,008,927 which is a continuation-in-part of application Ser. No. 190,440 filed May 5, 1988 U.S. Pat. No. 4,997,199; a continuation-in-art of application Ser. No. 07/433,825, filed Nov. 9, 1989; pending and a continuation-in-part of application Ser. No. 07/439,739, filed Nov. 21, 1989, pending.

FIELD OF THE INVENTION

This invention relates to a telephone, configured to perform as a general purpose computer (telephonecomputer) as well as a conventional telephone, while presenting a user-friendly appearance. Moreover, this invention relates to a method for communicating between the telephone-computer or a personal computer, and one or more networks for providing information and financial services.

BACKGROUND OF THE INVENTION

A device resembling a telephone with the capability of performing conventional telephone and computer functions in a user-friendly environment is desired to gain acceptance as a home terminal. Most remotely accessible financial and information provider services, such as automated banking or stock price quotation, are currently accessible using a personal computer (PC) or a "dumb terminal", i.e. a terminal device having no intelligence. Such systems are not fully user-friendly because the user needs some computer literacy and familiarity with the financial and information provider services' programs. The depth of their market penetration is generally limited to users who are knowledgeable in the computer field or to those willing to learn. Accessing such services using PCs is also restricted by the limited availability of PCs in the residences of most potential users. Moreover, these potential users lack the basic technical skills to operate a PC or they find a PC too inconvenient to operate.

It will also be appreciated that in recent years customers of one of these remotely accessible services, automated banking, have increasingly become accustomed to using automatic teller machine devices (ATMs). These devices have become relatively successful because they provide simple and clear "menus" of choices to customers at each step of each transaction. Using these simple menus, customers are readily led through the sequence of inputs required by the system to respond to customers' requests. It would be desirable if such services were conveniently available in the privacy of their homes. The present telephone-computer was developed exactly for the purpose of providing a readily available userfriendly microcomputer with the familiar appearance of a standard table telephone.

Financial and information provider services typically are remotely accessible using software prepared by individual programmers using personal computers. Typically, these personal computers are those manufactured by the IBM Corporation (IBM PC) or so-called "clones" (PC) manufactured by others. All these computers run various software programs which have been designed to run on an IBM PC. The PC system is currently so thoroughly entrenched throughout the industry that replacement by another type of system is unlikely. Any home terminal or computer intended to be employed with a remote access system now operating typically emulates the IBM PC "architecture". Further details of this requirement are set forth below.

To date, substantially all PCs have been configured to comprise a keyboard having 60 to 101 keys, a display device, and a housing containing the circuit boards of the computer, including various input/output (I/0) interfaces for connecting devices such as modems for communication, printers, and the like. It will be apparent to those of skill in the art that the provision of "PC functionality", the ability to run conventional PC software programs without modification to the software, places very substantial constraints on the design of a computer that is to fit within a relatively small housing conforming in size and shape to that of a conventional telephone. For example, virtually all PC programs are designed to be stored on floppy disks, or are initially supplied on floppy disks and later copied to a hard disk. Both of these memory devices require more space than is available in the housing of a conventional telephone. Similarly, the circuit boards used conventionally in PCs are much too large to fit within a conventional telephone, as are the QWERTY keyboards presently used. Accordingly, it is not possible to simply force the normal PC components into a housing resembling a conventional telephone. Moreover, it is desirable to eliminate the use of removable floppy disks and the like to simplify operation and to render it even more user-friendly, thus making it accessible to a wider class of possible users.

It is essential to provide a telephone-computer that can simulate the operation of a system comprising floppy and/or hard disk memory devices, as well as other I/0 devices such as printers and the like, while fitting within the confines of a familiar and non-threatening telephone and still provide all conventional telephone functions.

It will also be appreciated that if a home terminal is to provide access to a remote service computer to perform private services such as financial transactions, a very high degree of security must be built into the system, such that users cannot corrupt their own or other accounts, cannot modify other accounts, and, most importantly, cannot cause a system error that would cause the entire remote computer system to cease operations, however briefly. To do so, the home terminal must interact with the network in a sophisticated way. It is also highly desirable that the interaction of terminal and host be amenable to convenient alteration at later For example, there have recently been widely publicized instances of "software viruses" causing chaos in computer networks. It is therefore highly significant that the computerized telephone provided to the user by the present invention be updatable with respect to any hardware and software changes which may be required to eliminate the possibility of such bugs or viruses. It must also be capable of implementing new forms of security such as data encryption. The prior art teaches no system which provides anything remotely resembling this set of features in a home terminal intended for accessing, for instance, a banking system.

Megatel Computer Corporation, of Weston, Ontario, Canada, has been selling a single board computer capable of emulating an IBM Personal Computer and thereby capable of running conventional software programs intended for use with conventional IBM PCs.

This Megatel computer has a single circuit board combining a microprocessor, typically a Nippon Electric Corporation (NEC) model V25 or V40, a programmable gate array chip, sold by Xilinx Corporation under Model No. XC2018 or the equivalent, random access memory (RAM), read-only memory (ROM), and various I/O devices, as well as associated connectors and the like. Briefly stated, the use of the programmable gate array to connect the microprocessor to the memory and to the I/O devices has provided this computer with unparalleled flexibility in emulation of the basic functions of an IBM PC such that it is capable of running substantially all conventional software programs for the IBM PC. This is true even though in many applications the Megatel computer is not connected to external magnetic storage media, printers and the like, and even though the software would normally run only on computers configured for an IBM PC. To fully understand the significance, a brief discussion of the IBM PC compatibility is disclosed below.

As a rule, conventional software programs are "PCcompatible" when they are intended to be run on the IBM PC. However, not all "PC-compatible" programs will run on all PCs. For example, one program may require a hard disk having 40 megabytes storage capacity. Another may require one megabyte of RAM. A third may require an optical disk, a fourth a VGA adapter card, and a fifth, two floppy disks. Thus, PC-compatibility only implies, with respect to a particular software program, that a PC can be configured with appropriate optional internal devices and peripherals on which the software will then run. In other words, it does not mean that all "PCcompatible" software will run on the same PC.

The basic hardware components of the PC, as distinguished from its peripherals, include a microprocessor, ROM, and RAM, and circuit elements providing logical connection between these basic components as well as to the keyboard, to the display, and to any peripherals such as modems, printers, external memory and the like. The peripherals are normally connected directly to various dedicated "driver" an "interface" chips, which are in turn connected by logic circuit elements to the microprocessor, the RAM and the ROM. All PCs require some sort of hardware, i.e., discrete circuit elements, to provide appropriate logical connections to functionally "glue" the microprocessor, the RAM, the ROM, and the various dedicated I/0 devices and peripheral drivers together.

Certain software, referred to as the "BIOS", for Basic I/O System, is also essential to provide the "PC architecture". The BIOS provides the interface between the usual PC-compatible software programs (which are also referred in the art as "DOS-compatible", which means that they are designed to work with IBM's Disk Operating System, or DOS; DOS is only useful if the BIOS and BIOS-compatible hardware are already in place) and the actual hardware elements. The hardware elements plus the BIOS form the basic "PC architecture".

In the IBM PC, a custom designed "gate array" chip normally provides the logical connection between the microprocessor, the RAM, the ROM, and the various dedicated I/0 and peripheral driver elements. Others have provided these functions using so-called programmable logic array (PLA) chips. Such PLA chips comprise a number of predefined but not pre-connected logic gates on a chip. Connections are established by fusing fusible links disposed on the chip. Once programmed, the PLA circuitry cannot be further altered.

The BIOS used by Megatel's computer is also commercially available. The "glue" required to functionally connect the microprocessor, the memory, and the I/0 chips is provided by configuring a Programmable Gate Array (PGA) chip by supply of a series of signals, referred to by Xilinx as "configuration programs" and sometimes referred herein as "configuration code", or "configuration software". Essentially, this configuration code defines the logical connection of various basic logic elements on the PGA chip.

A significant advantage is provided by use of the PGA chip, in that, by supplying new configuration code, changes can be made to the hardware connecting the microprocessor to the memory and the I/0 chips on the circuit board. For example, if a particular hardware change needs to be made to accommodate a particular software program, this can be done readily by simply supplying reconfiguration code appropriately to the PGA chip and reconfiguring it before running the software.

Use of the PGA chip has extremely powerful and extensive implications. For example, a piece of software running on a IBM PC operates properly when it "receives" an appropriate sequence of signals from the microprocessor in response to the signals it "generates". For example, a microprocessor may be directed by software to send a certain data item to a floppy disk for storage. The floppy disk controller responds to such a request with a predetermined acknowledgement signal. When this signal is received by the software, it then performs a subsequent function. Accordingly, if the PGA chip is configured to respond to a particular signal provided by the software with the proper acknowledgement signal, the software can be "fooled" into thinking that the PC is configured with certain peripherals when in fact none is provided. To provide "software-compatibility" the PGA chip need simply be configured to respond to a known sequence of signals with a corresponding sequence of response signals, thus fooling the software into thinking that it is running on a properly configured PC.

The Xilinx "Programmable Gate Array Data Book" (1988) discusses at pages 6-38 —6-40 use of this technology for "Self-Diagnosing Hardware", suggesting that the device . . . can perform diagnostic functions at power-up, or in test modes, and perform normal functions where the board is determined to be operational. It is specifically suggested that this will be particularly useful for testing peripheral control logic using loopback techniques, I/0 and memory error detection circuitry, and interrupt techniques.

As previously discussed, Megatel has been using the PGA technology to emulate a PC. However, to the best of the inventors knowledge, there has been no application of this PGA technology to the specific problem of providing a computer configured as a telephone for accessing a variety of information and financial services; no use of this PGA technology to physically emulate a computer while providing various functions of a typical telephone; and no implementation of a home computer in which some portion of the hardware is defined by configuration code supplied to a programmable gate array, much less one that can be remotely reconfigured, e.g. so as to avoid and cure a "hardware virus", to provide an improved security function such as data encryption, or to otherwise reconfigure the logic of a terminal once installed in the user's home. By having this feature, additional terminal functions can also be remotely added to the telephonecomputer after its installation in the users' homes. This has not been done prior to the present invention by Megatel or otherwise, to the best of the inventors' knowledge.

Use of microprocessors for telecommunications application is known in the art as shown by Subhash Bal, "New Generation Microprocessor for Telecommunication Applications." Proceedings 1980-International Conference on Communications, Seattle, Washington, (June 8–12, 1980) pages 11.5.1–11.5.4. Additionally, microprocessors have been used as control apparatus for a number of communication system administration functions and in switching systems as shown in U.S. Pat. No. 4,580,011 to Robert E. Glazer, issued Apr. 1, 1986 and U.S. Pat. No. 4,629,832 to Robert A. Carson et al, issued Dec. 6, 1986. It is known that, to increase system integrity, the administration functions in a telephone network can be controlled by a microprocessor to facilitate the interaction of a private branch exchange or similar telephone network with a telephone central office. It is also known to perform telephone protection functions through a microprocessor. Operation of computers with simple interfaces and the connection of several computers to a host computer in a network through modems is also known in the prior art. However, the prior art does not teach the use of a microprocessor controlled primarily through a 12-key keypad of a normal telephone device where the keypad also operates a stand-alone telephone unit and additionally provides user interface to the microprocessor.

SUMMARY OF THE INVENTION

The present invention relates to a telephone configured as a programmable general purpose computer (telephone-computer) with a simplified user interface. The telephone-computer has the general appearance of a standard desk telephone. To a user, the invention will appear and function as a telephone set and not as a conventional computer or data terminal. It enables nontechnical users who are uncomfortable using computers but are familiar with telephones to operate the present computer which is disguised as a telephone. The telephone-computer comprises six basic components which cooperate together to provide improved telephone and computer functionality. These basic components include (1) a primary microprocessor comprising a central processing unit (CPU), memory elements associated with the CPU and certain hardware integrity features protecting the CPU, (2) a Programmable Gate Array (PGA) comprising a logic cell array which provides the means for dynamically reconfiguring the basic architecture and control logic of the primary microprocessor, (3) telephone electronics comprising (i) a manual telephone circuit including a dialer, speech network and ring detector, or (ii) a telephone function within a communications processor receiving input from a telephone keypad and a keyboard input device and associated hardware to provide an interface between the telephone operation of the device and the primary microprocessor, (4) a modem to transfer data to and from the primary microprocessor over the telephone line and, in an alternative embodiment, provide pulses or DTMF tones over the telephone line, and perform signal and tone detection functions, (5) a smart card reader to read input from a removable memory element and (6) a 9600 Aboo Baud Modem.

The present telephone-computer is designed to be operated, in most circumstances, through a standard telephone 12-key keypad input. In an alternative embodiment, the 12-key keypad input device may be augmented by one or more programmable function keys such as for speed dial and re-dial. Moreover, in either embodiment any of the 12-keys of the keypad can be programmed through the primary microprocessor for specific functions desired. An additional 52-key keyboard in the QWERTY format, normally hidden in the telephone housing, provides additional inputs to the central processing unit of the primary microprocessor through the communications processor. To operate the present telephone-computer as a telephone, the operator lifts the handset and the device immediately 15 functions as a telephone.

The primary microprocessor in conjunction with a multipurpose graphics display controller, or the PGA, provides an output to a small display device such as a Liquid Crystal Display (LCD) mounted in the housing of the device for viewing by the operator. In an alternate embodiment, the display controller is within the microprocessor where a CGA controller function is performed. In another alternative embodiment, a touch-screen is used in conjunction with the liquid crystal display. In this embodiment, the touch-screen both displays information from the microprocessor and receives inputs keyed in by the operator by touching specified locations on the display. The touch-screen will require its own input processor to communicate with the primary microprocessor, as is known in the art.

The primary microprocessor itself is connected to the telephone line through a modem and is capable of dialing and communicating with other parts of a computer network. The primary microprocessor may be programmed to incorporate dedicated software functions including a record manager for reading and writing data, such as records, into the smartcard and to the primary microprocessor memory, a telephone list, activity log, a user configuration record and a diagnostic log. The logs may be sent to another computer via a telephone line for further processing. The primary microprocessor includes certain software diagnostics which control the microprocessor's status and provides for overall microprocessor protection. The communications processor is also connected to a modem which permits the transfer of data from the primary microprocessor over the telephone line and transfer of modem command signals from the communications processor.

The primary microprocessor is a general purpose CPU and may be programmed in any standard manner. One such application program usable on the primary microprocessor is implemented using a software language designated Home Access Language (HAL) which is formatted in logic pages. One essential function of a network host computer is to provide a series of HAL application program "pages" which are downloaded to the present telephone-computer. A page includes screens to be displayed on the LCD display and logic associated with specific operations described on the screens. The application program written in HAL is compiled into pseudo-code by the network host computer and is translated into an executable format by a HAL interpreter incorporated in the memory device. The application program, when incorporated in the primary microprocessor, permits it to receive input from the communications processor and the modem and to perform certain programmed functions. More specifically, the program pages supply the telephone-computer with sufficient "prompts" to elicit from the user whatever information, i.e., user codes, desired transactions, and the like, required to access one of a plurality of service computers to which the network host computer is connected via conventional telephone lines. More specifically, the telephone-computer communicates with the network host computer via a message having a first protocol. The network host computer transforms this information into whatever second protocol is conventionally required to communicate with the service computer.

One object of the present invention is to provide a device with the features of a computer, housed in a unit which appears to the user to be no more complex than an ordinary telephone.

Another object of the present invention is to provide a user friendly microprocessor controlled for most operations through the 12-element keypad of a normal telephone.

Another object of the present invention is to provide a highly capable computer usable as a telephone and also responsive to the user's commands made through the keypad.

Another object of the present invention is to provide a microprocessor with enhanced integrity features allowing for an improved interaction with telephone electronics and other input devices.

Another object of the invention is to allow a network host computer to download program pages which are compatible with the present telephone-computer or a PC to access a variety of different information and financial services which communicate with the network host computer via conventional telephone lines in languages which are compatible with the normal information and financial services, but which are not compatible with the present telephone-computer or the PC Yet another object of the invention is to provide a telephone configured as a reconfigurable general purpose computer which may be reconfigured on site or remotely.

Features and advantages of the present invention will be better appreciated from the detailed description below, taken in conjunction with the attached drawings.

BRIEF DESCRIPTION OF THE DRAWINGS

FIGS. 3 and 4 are front and rear perspective views of a second embodiment of the telephone-computer including function keys.

DETAILED DESCRIPTION OF THE PREFERRED EMBODIMENT

Figure 1:
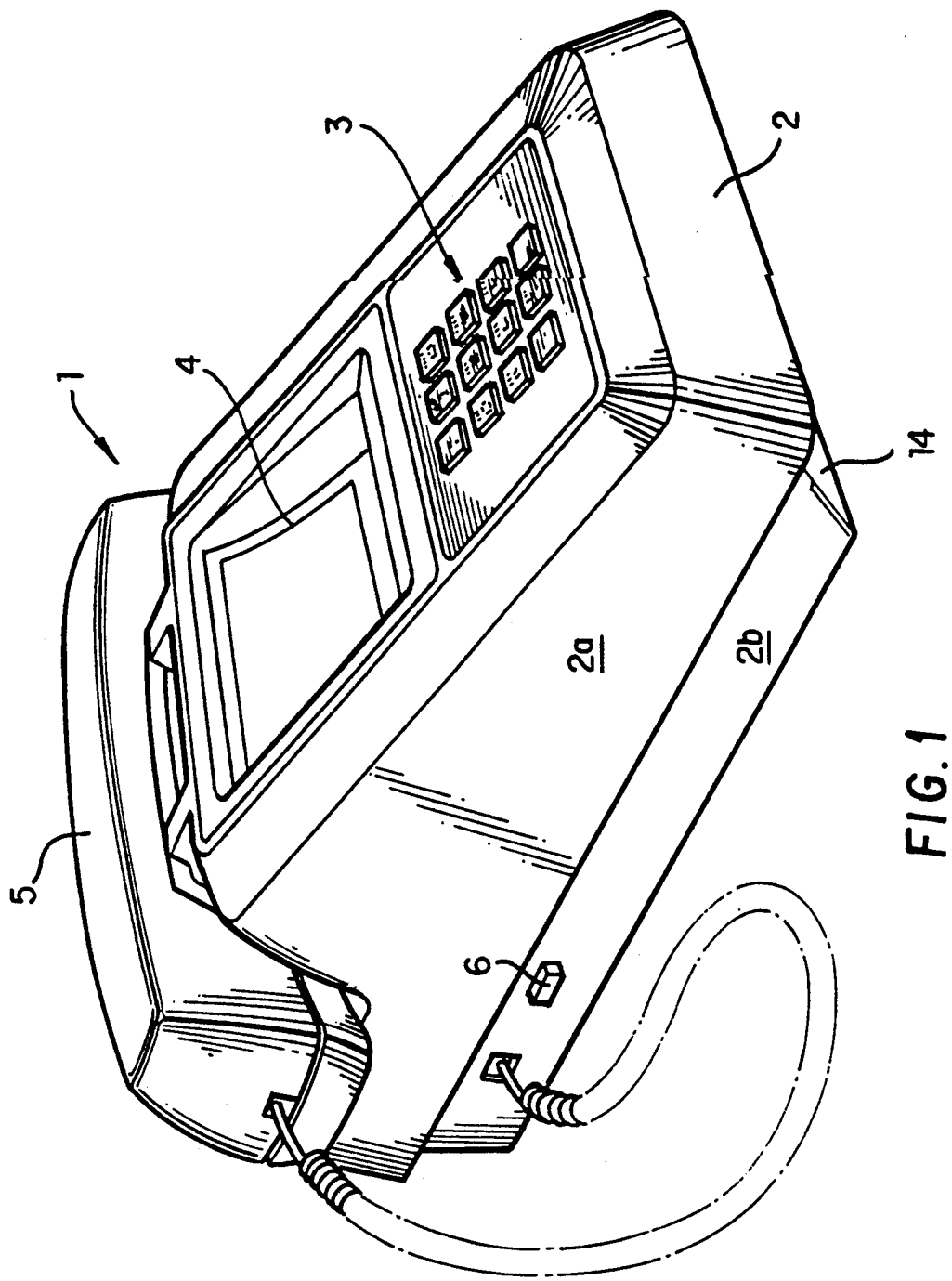
FIG. 1 is a front perspective view of the first embodiment of the telephone-computer.
Figure 2:
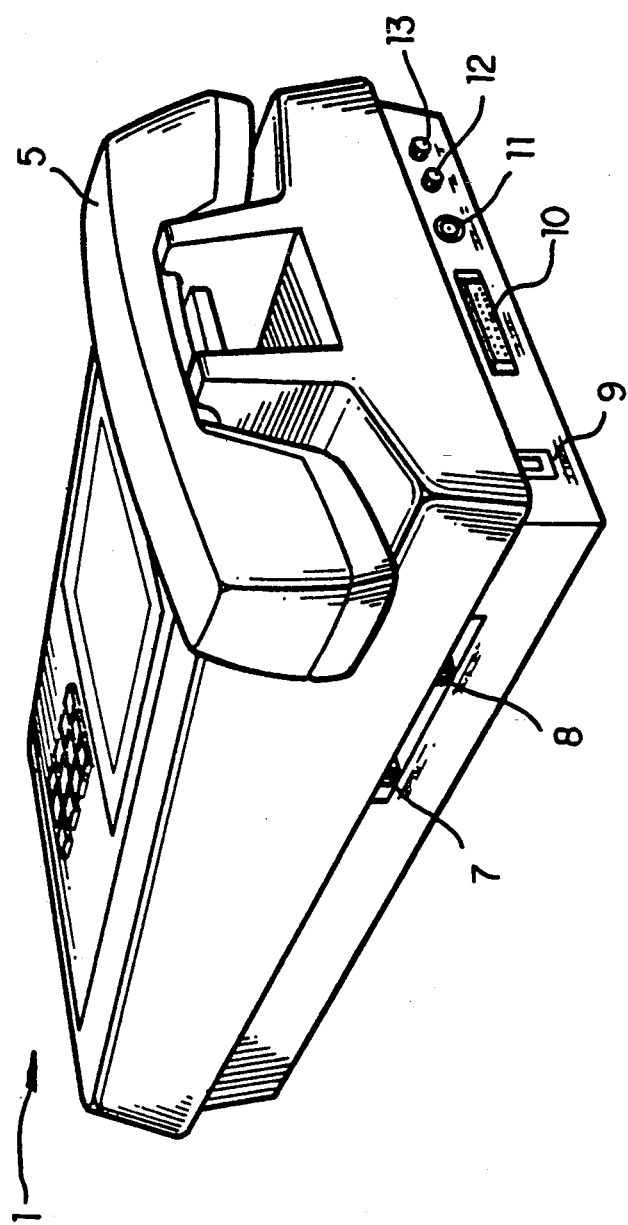
FIG. 2 is a rear perspective view of the first embodiment of the telephone computer.

Referring to FIGS. 1-4, a telephone-computer 1 of the present invention has a telephone housing 2, with an upper housing 2a portion and a lower housing 2b portion, which has the overall appearance of a conventional desktop telephone unit so that it presents, to a technically unskilled operator, a format with which he or she is familiar, i.e. a conventional telephone. The telephone-computer may be incorporated in a wall telephone or any other conventional telephone format and is designed to operate both as a standard telephone unit and as a microcomputer for communicating with a computer network. The telephone-computer includes a standard 12-key keypad 3, a display monitor 4, a handset 5, and a keyboard release button 6 for permitting a keyboard 14 (see also FIGS. 5 and 6) to slide out of the lower housing portion of the telephone-computer when the button is pressed. As shown in FIGS. 2 and 4, other features of the telephonecomputer include a speaker volume control switch 7; a ringer volume switch 8; a pulse/tone switch (not shown) located on the bottom of the lower housing portion; a telephone line jack 9; an accessory port 10 (see also FIG. 12) which supports a Centronics parallel port and two serial ports external monitor interface 11; and a monitor brightness controller 12 and a monitor contrast controller 13 for the display monitor 4 The parallel port and serial ports support a printer, an optical sensor, a floppy disc, a memory storage device and other peripherals, and permit speed loading of the RAM or an electrically programmable, nonvolatile memory device.

Figure 6:
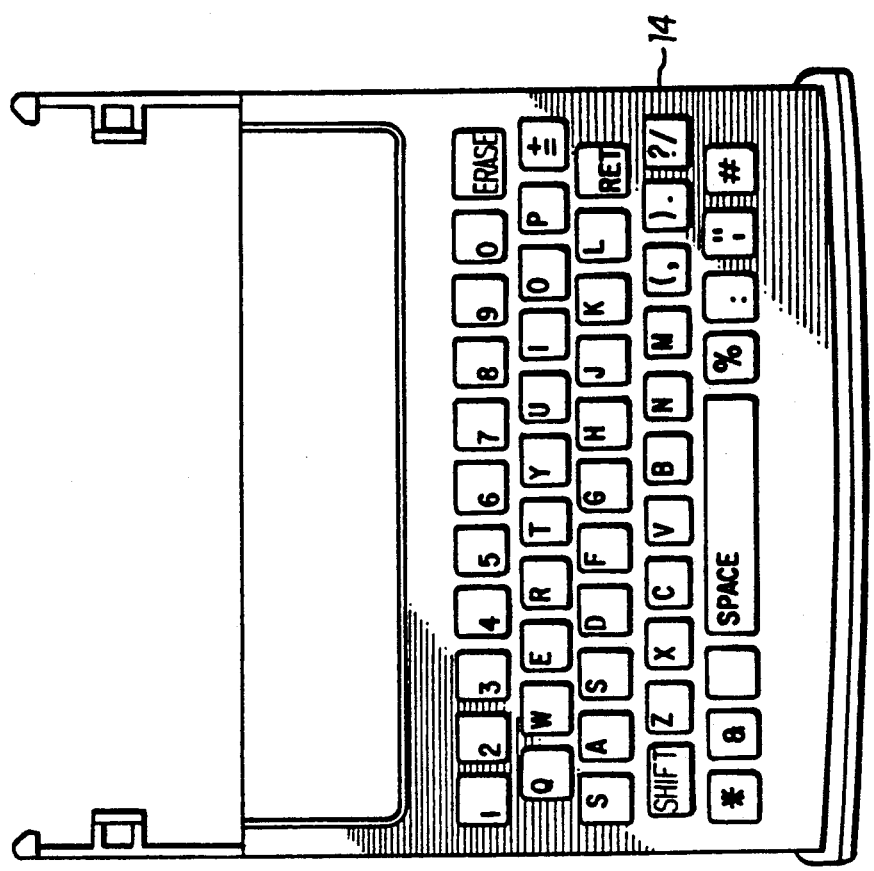
FIGS. 5 and 6 are side and plan views of an access drawer having a QWERTY 52-key keyboard.
Figure 5:
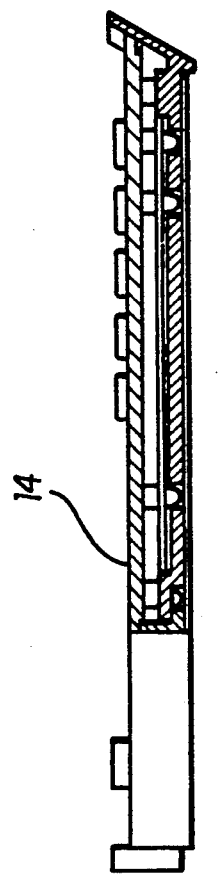

The present telephone-computer includes a primary microprocessor and associated memory devices (see FIGS. 11 and 12), and is purposely designed with a simplified user interface. The interface operates through the telephone-computer using a conventional 12-key keypad 3 utilized in conventional telephones. One key of the 12-key keypad is designated as a HELLO key and activates the primary microprocessor control of the telephone when the telephone is on-hook. The telephone keypad activates either tone or pulse dialing functions, as chosen by a manual switch located on the bottom of the lower housing portion, for the electronics of the telephone incorporated in the device and also provides input through a communications processor to the primary microprocessor. The primary microprocessor may also receive input through the communications processor from a hidden 52-key keyboard 14 as shown in FIGS. 5 and 6. This hidden board has a QWERTY format and slides on the lower housing portion and is retracted from the housing by pressing the keyboard release button 6 and pulling the keyboard. The user interface also includes the display monitor 4 which is preferably a 5-inch liquid crystal display (LCD) and receives its input directly from the microprocessor. Other displays such as a SONY Watchman cathode ray tube (CRT) display are compatible with the microprocessor and a controller and may be used instead of the LCD with some packaging modifications.

Figure 3:
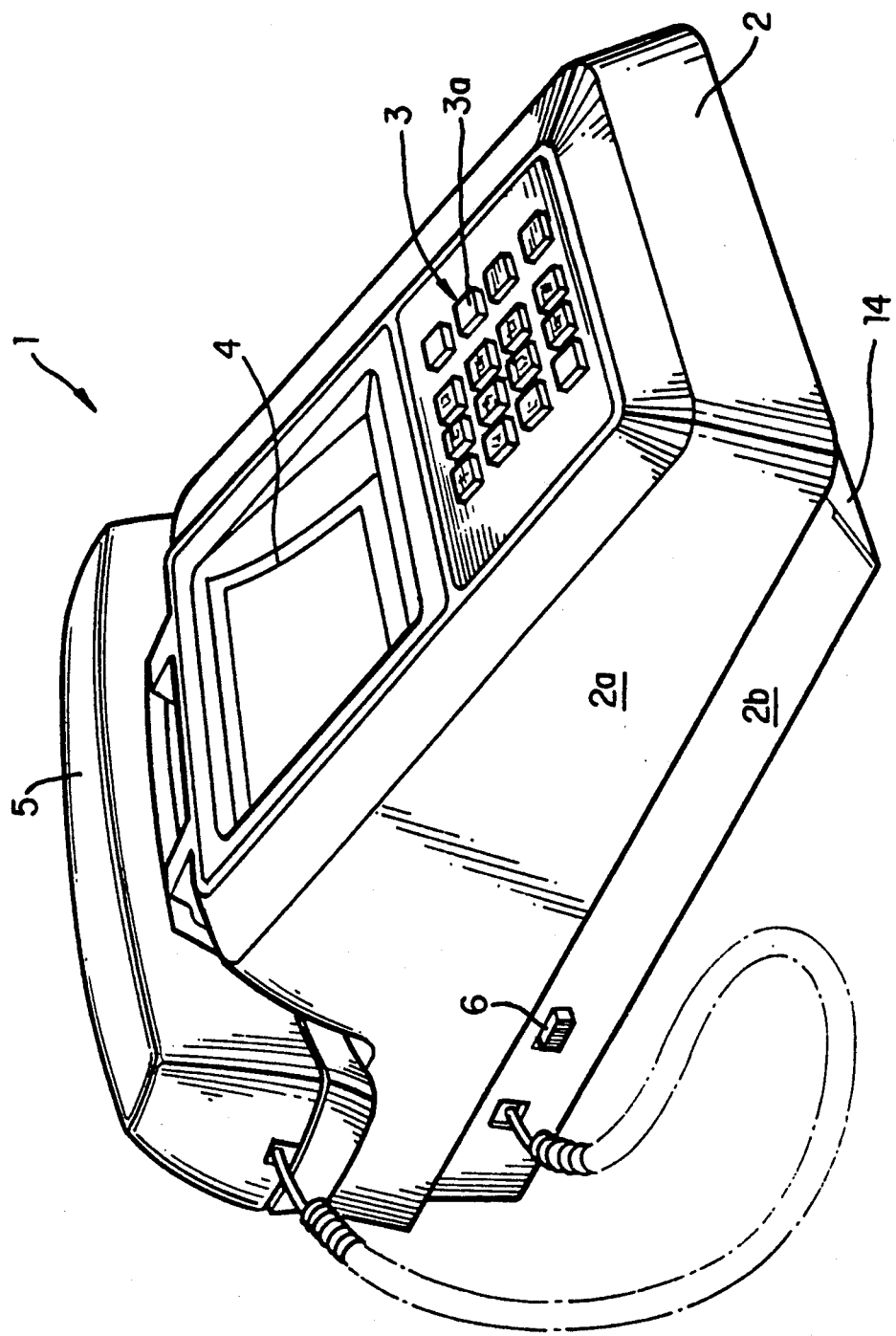

FIGS. 3 and 4 show a second embodiment of the telephone-computer in which the 12-key keypad is augmented by four function keys. In this alternative, one key is a service key which performs the functions of the HELLO key. The other function keys are programmable and may perform the standard functions of speed dial, flash dial or redial.

Figure 7:
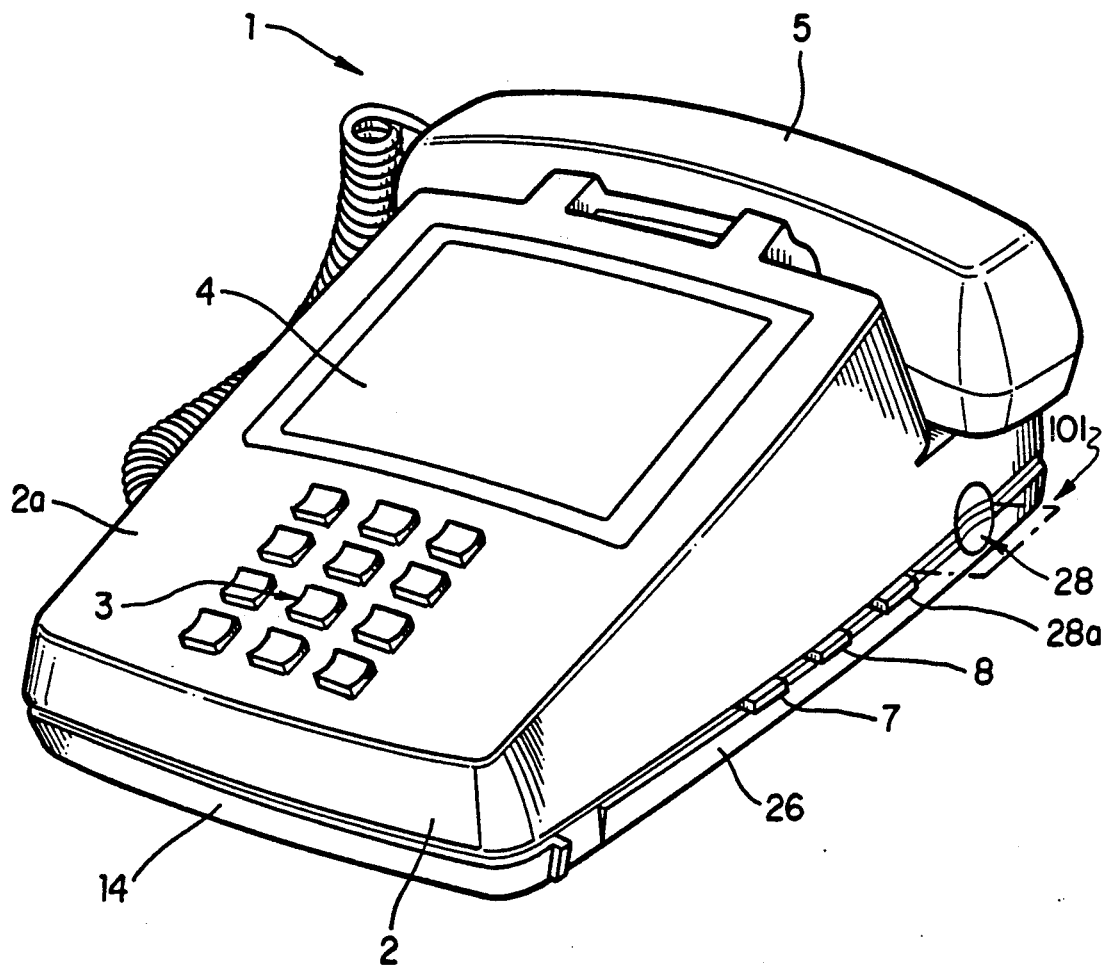
FIGS. 7 and 8 are front and rear perspective views of a third embodiment of the telephone-computer, including a built-in smart card reader.
Figure 8:
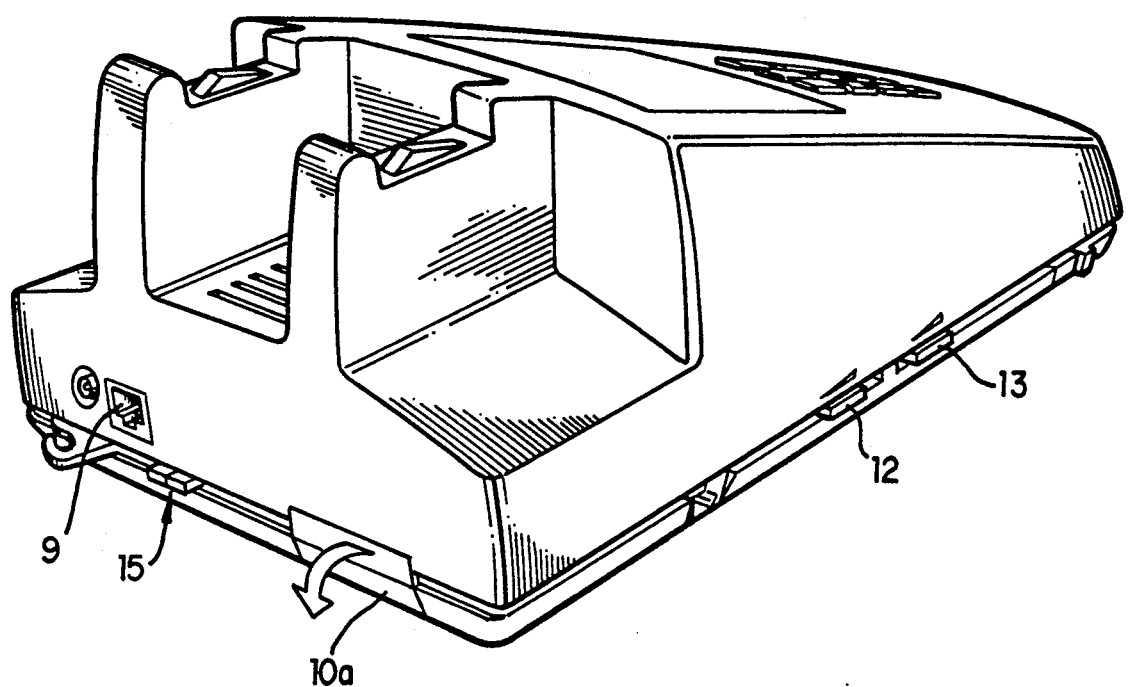

FIGS. 7 and 8 show a third embodiment of the telephone-computer 1 in which the housing 2 is shaped slightly different from the embodiments of FIGS. 1 and 3. FIG. 8 is shown with the handset removed from the telephone-computer. Specifically, the telephone-computer of this embodiment includes a built-in smart card reader 28 for smart card 100 which is accessed from the right side of the telephone-computer. Again, as is with the first embodiment, the keypad 3 has 12 keys, but programmable function keys can be augmented as is described and shown with respect to the second embodiment. Similarly, the embodiment of FIGS. 7 and 8 includes upper and lower housing portions 2a, 2b, a LCD display 4, a handset 5, a speaker volume control switch 7, a ringer volume switch 8, a pulse/tone switch 15, a telephone line jack 9, an auxiliary port 10 (showing a cover 10a) which supports a centronics parallel port and two serial ports, a monitor brightness controller 12, a monitor contrast controller 13, and a keyboard 14. In addition, a smart card release button 28a is included. Note that in this embodiment, a keyboard release button 6 is not needed as the keyboard is held in the hidden position by a locking mechanism or by friction which can be overcome by lightly pulling the keyboard.

Figure 9:
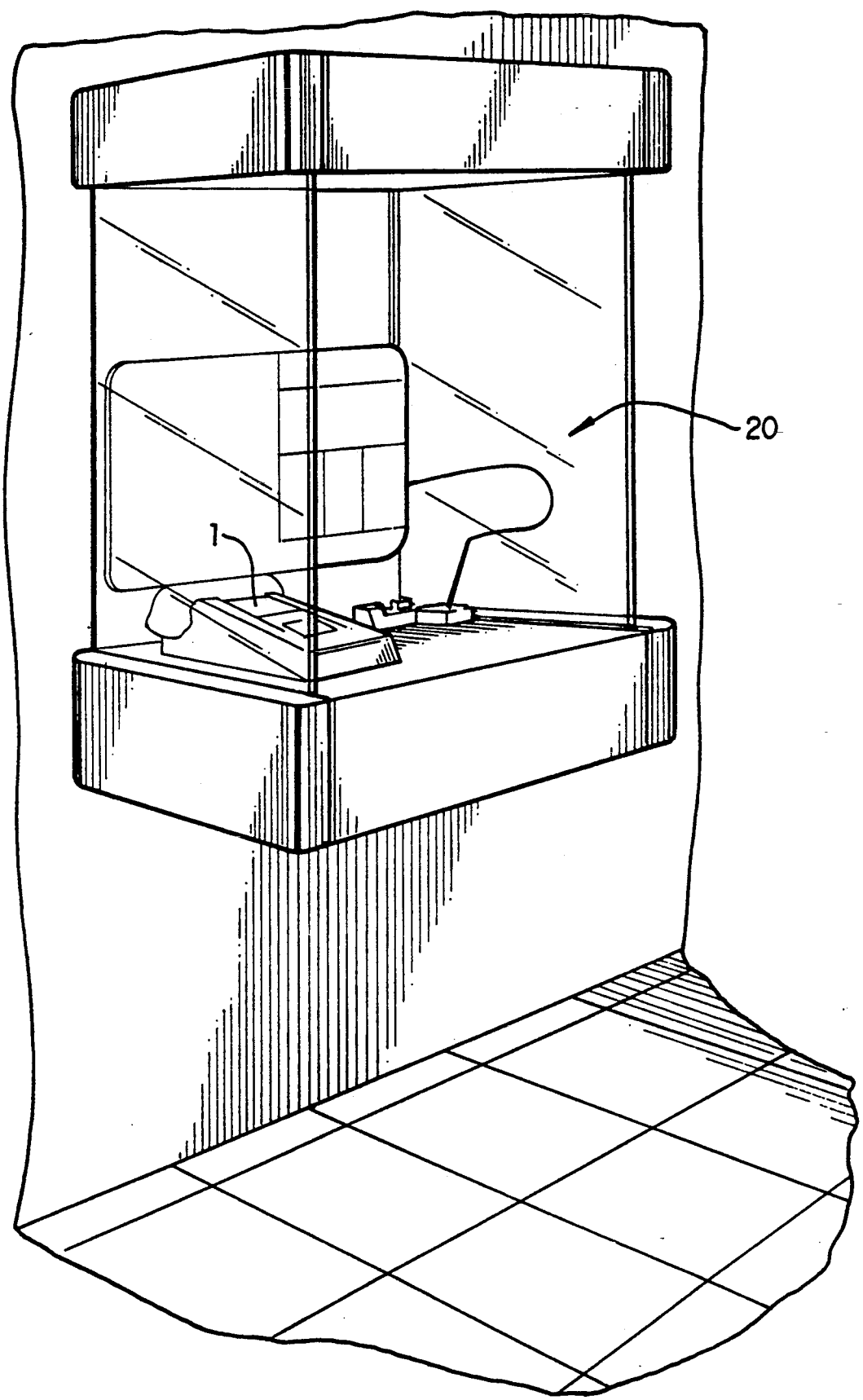
FIGS. 9 and 10 are perspective and plan views of the invention as used in a public booth deployed with peripheral equipment.
Figure 10:
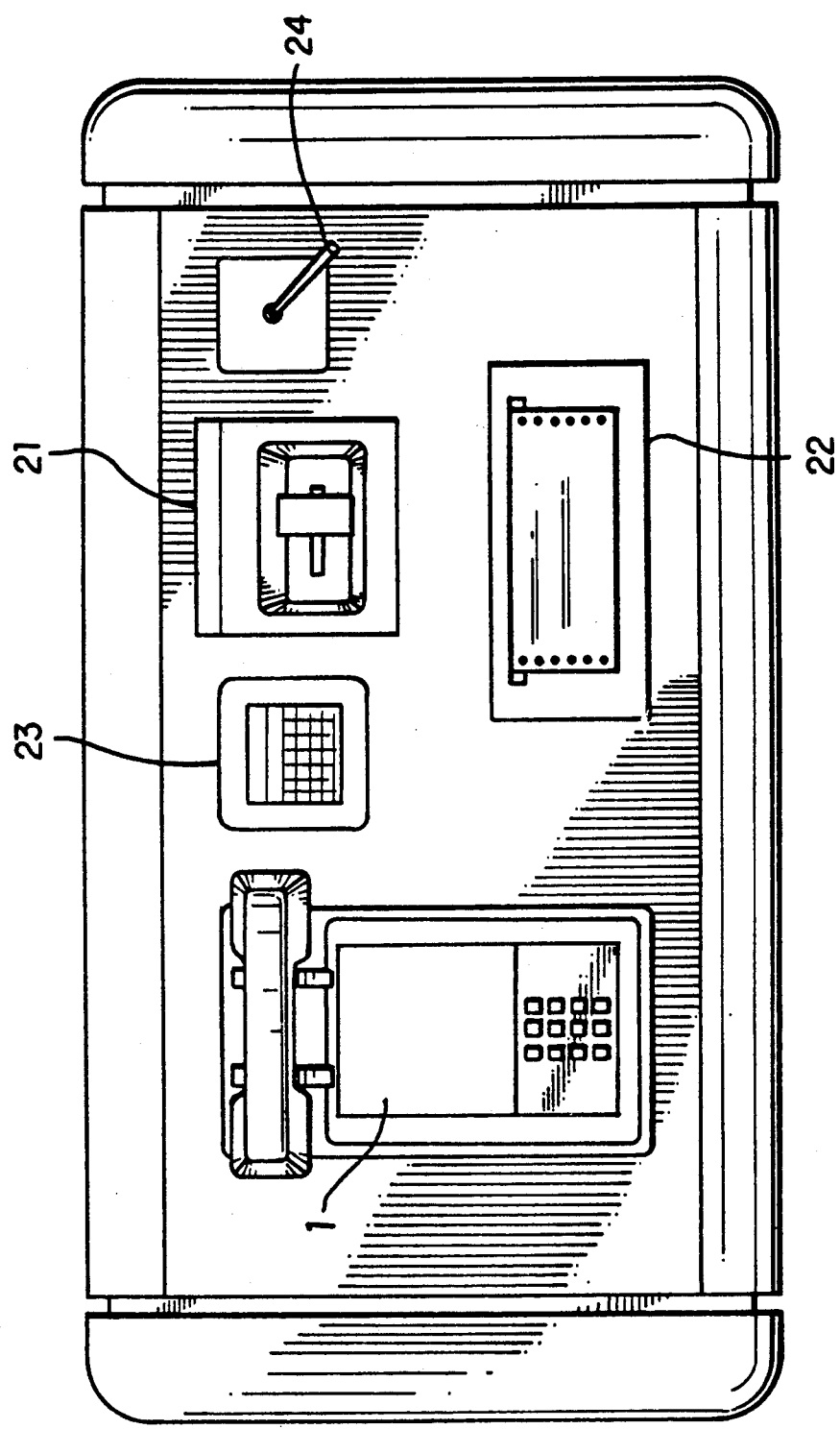

The present telephone-computer may be operated at a public booth 20 as shown in FIGS. 9 and 10. In this configuration, the telephone-computer is placed in a form fitted hole in a counter top with the upper housing and a smart card reader opening visible. The public booth is deployed with several peripheral devices in close proximity in a user-friendly arrangement, which may include, as shown in FIG. 10, a separate card reader 21 for reading magnetic information imprinted on cards and a printer 22 for printing transaction journals. Other items connected to the telephone-computer in this configuration, but which are not user-visible, are (1) an attachment called an expansion box for converting signals coming out of the connector on the back of the apparatus, allowing for printer connection, (2) two floppy disc drives for expanded software and (3) an external power supply to drive the card reader and disc drives. Additional non-essential equipment such as a calculator 23 and a pen holder 24, which are made readily accessible to the user at the booth, can be included.

Figure 11:
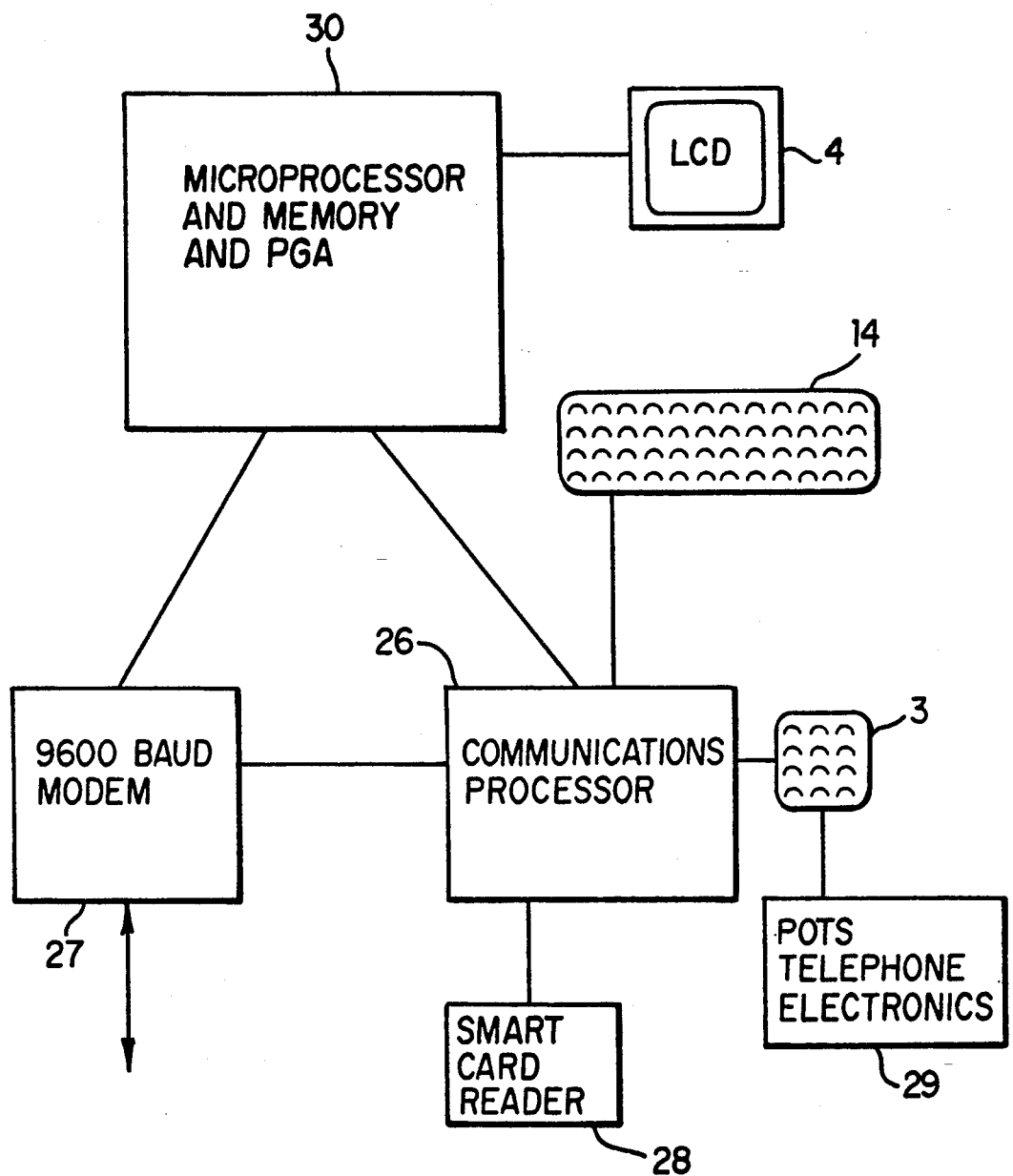
FIG. 11 depicts in a block diagram format, the functional components of the telephone-computer.

FIG. 11 depicts the basic hardware of the present telephone-computer. The present telephone-computer includes six basic elements: (1) a primary microprocessor system with memory, generally indicated by 30, (2) a communications processor generally indicated by 26, (3) a POTS telephone, generally indicated by 29, (4) a 9600 Baud modem 27, (5) a smart card reader 28, and (6) a Programmable Gate Array (PGA) chip, also generally indicated by 30. The communications processor provides input to the primary microprocessor and also acts as a standard telephone. The modem is connected to the telephone line and provides an interface between the primary microprocessor and other elements of the computer network, as better shown in FIG. 15.

Figure 17:
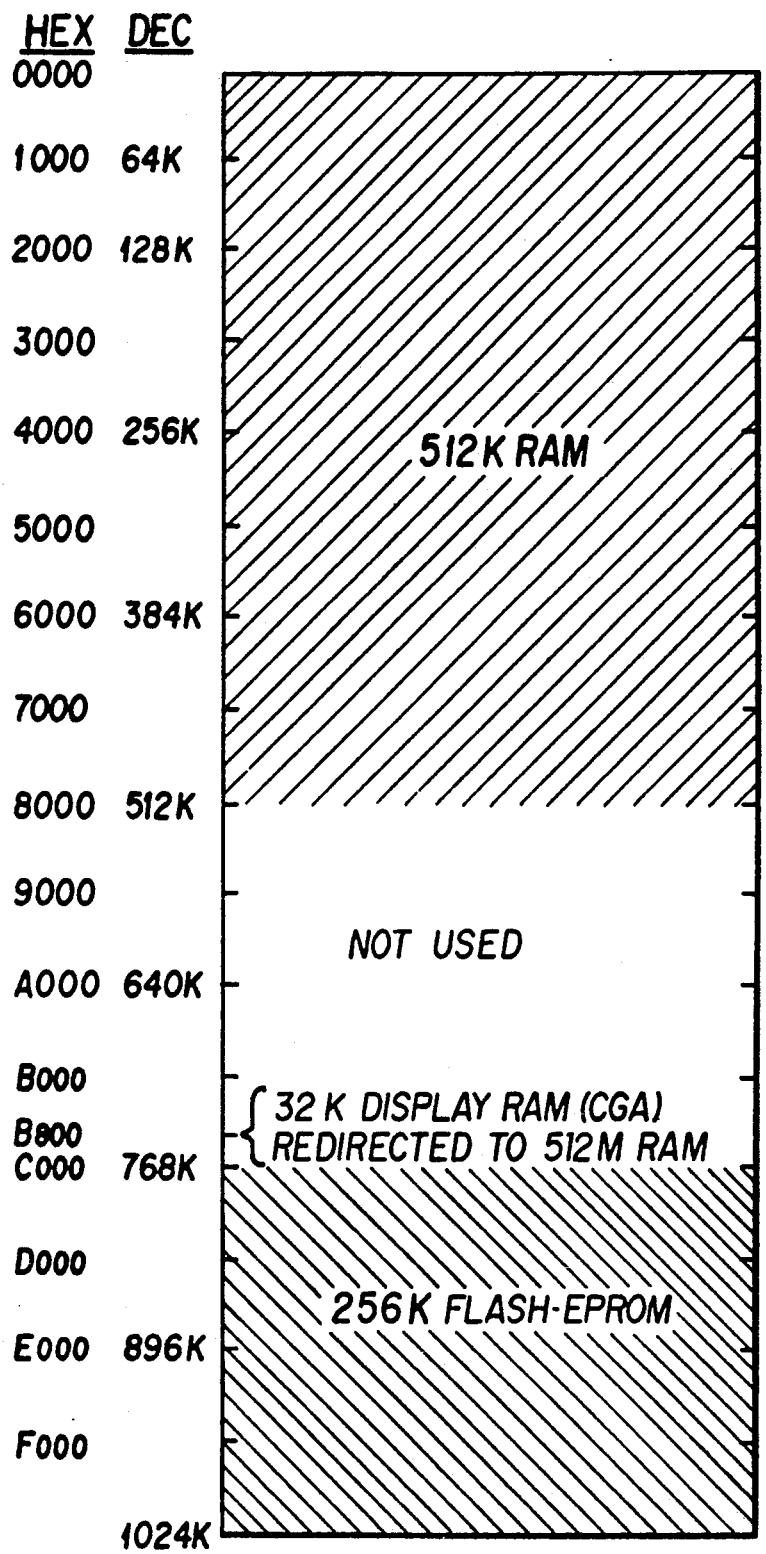
FIG. 17 is a memory map of the memory elements of the primary microprocessor of the telephone-computer.

A map of the primary microprocessor memory of the telephone-computer is shown in FIG. 17, which shows the memory allocation between the RAM and the FLASH-EPROM and their addresses. In the preferred embodiment, the microprocessor includes a volatile writable 256 KByte RAM memory (expandable to 512 KBytes), and two electrically programmable, nonvolatile FLASH-EPROMs, a primary and a secondary, each with 128 KBytes of memory. The volatile RAM memory is intended for holding microprocessor program information and other data. A 32 KByte RAM memory is allocated within the volatile RAM for the CGA display. The FLASH-EPROMs incorporates a character generator code for the display and include an interpreter for programs used with the microprocessor, certain elements for the programs' telephone interface features and the required software for start-up of the program. In addition to the primary microprocessor there is another microprocessor and a long-term, nonvolatile memory which are stored on a credit card sized removable card or on a smartcard. The user could then readily transfer data from one microprocessor to another. The smartcard may be used for recording user information such as telephone numbers and addresses, bank records and other financial data. To preserve the telephonecomputer's compatibility with the IBM-PC, the addresses normally allocated to the CGA display memory are used for other normal computer operation purposes, but the system's BIOS redirects data normally sent to these addresses to the RAM memory that is free.

In an alternative embodiments, the primary microprocessor memory may include a battery-backed-up non-volatile RAM memory protected for a specified period and a non-volatile non-writable ROM instead of the FLASH-EPROM. This memory is used for the performance of certain specified microprocessor functions. The battery backed-up non-volatile RAM memory is used for storage of user information, such as telephone numbers and addresses instead of the smartcard.

Figure 12:
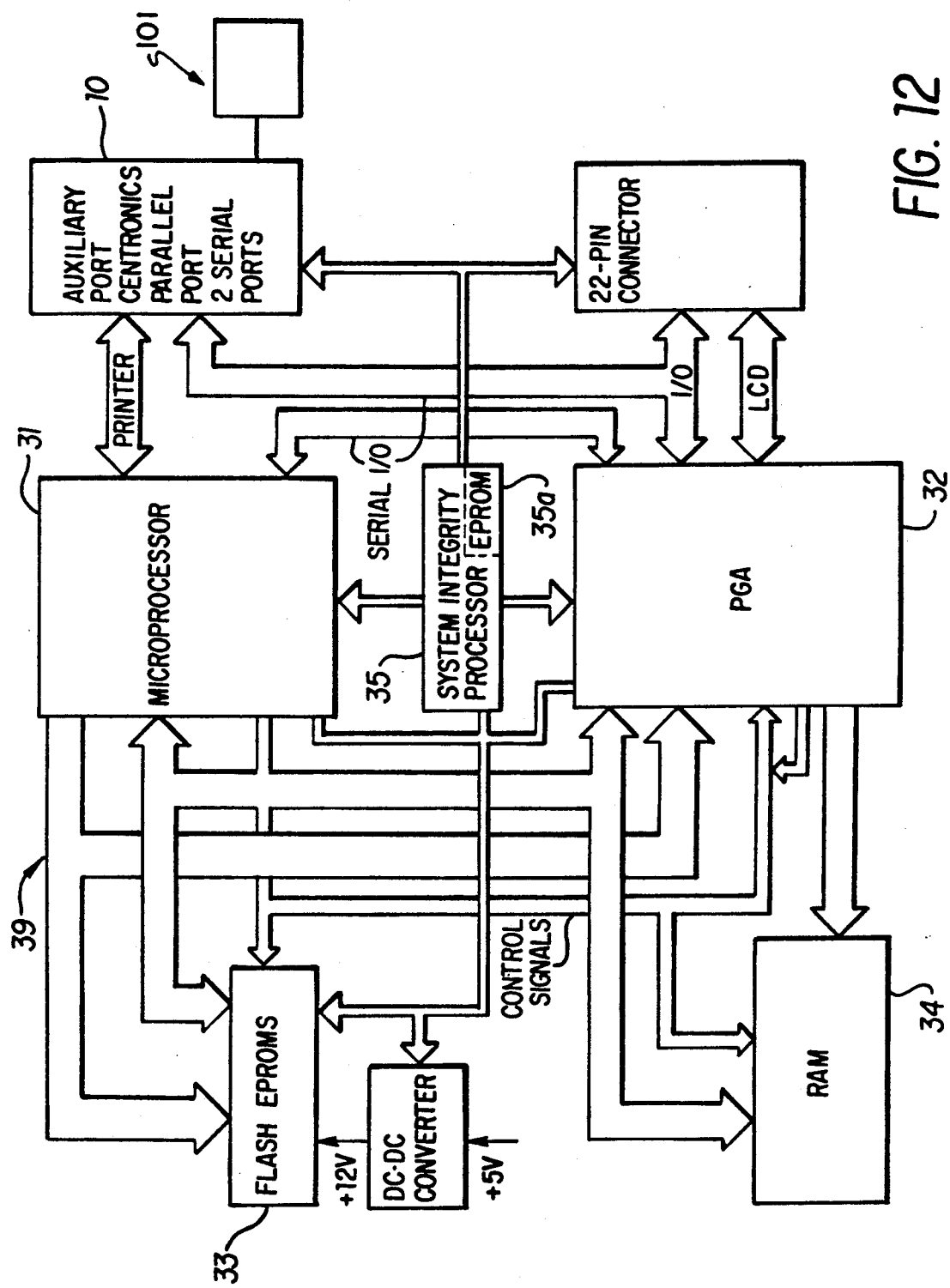
FIG. 12 depicts in a block diagram format principal semiconductor components utilized in the telephonecomputer.

FIG. 12 shows in block diagram form the principal elements of the remotely-reconfigurable computer system comprising the telephone-computer 1, similar to the one shown and described in copending Application Ser. No. 439,739 filed Nov. 21, 1989, of which this application is C-I-P thereof. The primary microprocessor includes an 8086 compatible central processing unit 31 which is compatible with the standard International Business Machine (IBM) PC/XT at the BIOS level. The microprocessor 31, which may be a Nippon Electric Corporation (NEC) Model V25 or V40 or an equivalent, is connected to a programmable gate array (PGA) 32 which will typically be the model XC2018, produced by the Xilinx Corporation of San Jose, California. The PGA, also referred to as a logic cell array (LCA), provides the means for dynamically reconfiguring the basic architecture and control logic of the computer. The glue required to functionally connect a microprocessor, memory devices and input-output chips is provided by configuring the PGA chip by the supply of a series of signals, referred to by Xilinx as "configuration programs" and sometimes referred to as "configuration code" or "configuration software". The PGA contains flexible memory elements, logic circuits and connective elements which, when properly configured, allow the PGA to assume the character of any number of logic functions, including, for example, a UART, a printer driver or a display driver.

A significant advantage is provided by use of the PGA chip, in that, by supply of new configuration code, changes can be made to the hardware connecting the primary microprocessor to the memory and the input/output chips on the circuit board. For example, use of the PGA chip in many cases will allow reconfiguration of the hardware to support new peripherals such as an enhanced resolution display, an optical disk storage device, socalled "smart" or debit-card readers, or the like, which in other systems would normally require the physical addition of a new circuit board.

In the preferred embodiment, the reconfiguration code necessary to program the PGA, so that the system can carry out its assigned functions, is stored in the FLASHEPROMs which are erasable in response to a signal received from a remote location. Thus, reconfiguring of the PGA, for example, to allow for the addition of a new peripheral, can be done remotely by simply supplying a new configuration code to the FLASH-EPROMs. This allows the PGA chip in a computer installed in a user's home to be reconfigured essentially at will, at high speed and low expense without the requirement of a service call.

For example, to cure a software bug or to eliminate a software virus, the PGA can be reconfigured remotely simply by supplying a new configuration code to the FLASH-EPROMs. In the banking terminal application, when a computer virus attacks the microprocessor 31, such a virus will have to conform to the microcode used to run the microprocessor. By downloading new "pages" of programs having different microcodes to the FLASH-EPROMs, the virus will not be able to interact with the new microcode and will cease to operate, thereby ceasing to interfere with the operation of the computer. Similarly, if communication between the service terminals and the service computers is corrupted or tapped, data encryption can be provided by reconfiguring some portion of the code stored in the FLASH-EPROMs to reconfigure the gates of the PGA.

The microprocessor 31 and the PGA 32 are connected to the main memory, a conventional RAM 34. The RAM will normally be used to store application programs downloaded from a remote host and also stores reconfiguration code when first received, prior to the code being copied into the FLASH-EPROMs. The PGA 32 is also connected to the port 10 which allows the functions accessed through the port 10 to be programmed to allow changes to accessories used with the telephone computer 1.

Communication with the telephone computer is provided via the auxiliary port, indicated generally at 10, which supports a centronics parallel port and two serial ports. Communication with the network host computer 60 (see FIG. 19) is provided via one of the serial ports. In the present invention, this serial port is connected both to the primary microprocessor and to a system integrity chip 35, which is typically a single chip Model 16C54 computer sold by the Microch Corporation. This chip has the capability of both storing and executing code. Certain "system intialization software" code, required to initially program the PGA chip 32 is stored permanently in the system integrity chip's non-volatile, one-time programmable EPROM 35a at manufacture (a read only memory device may be used alternatively in place of the EPROM). In response to a simple reset signal received from an external logic device via the serial port, the system integrity chip is capable of using this code to reconfigure the PGA chip. Typically, the PGA chip will first exercise the microprocessor 31 and verify circuit connections. Thereafter, the configuration code can be downloaded via either the same serial port or another serial port, which is stored in the RAM 34 and then copied to the FLASH-EPROMs to reconfigure the PGA.

More particularly, suppose that through error the entire system has been deprogrammed, or alternatively suppose that the terminal is being manufactured and has never been programmed. In either case, the EPROM 35a of the system integrity processor 35 will have stored therein the basic "system initialization software" required to allow configuration of the PGA. The system integrity chip, which may also be termed a "test processor", initially configures a portion of the PGA to perform a "serial scan test" which will verify the physical circuit connections of the chip, as later described in more detail. This is particularly useful because the PGA chip 32 will typically be physically connected to substantially all signal paths on the circuit board, so that this test is in fact substantially complete.

One of the principal functions of the PGA, which is ordinarily performed by expensive custom designed chips in IBM PCs and by programmable array logic (PAL) chips in other PC-compatibles, is to interface the microprocessor 31 to the LCD display 4. The PGA can also be readily reprogrammed to drive other sorts of displays such as conventional EGA or CGA monitors, plasma displays or the like. In some case, it may be desired to employ a further additional display driver chip, which itself provides certain display driver modification possibilities. Again, the reconfigurability of the PGA allows very substantial flexibility in use of the device.

In an alternative embodiment, when the system requirements stabilize, the telephone-computer may contain custom-designed chips, rather than using the PGA, for performing the required hardware functions. In this embodiment, addition of a new peripheral may require the replacement or addition of new custom-chips to the present telephone-computer. In such a case, the low-level microcode would remain flexible so as to allow for changes to the basic control logic and operating software of the computer.

As indicated generally at 10, the microprocessor 31 is connected to certain of the input/output chips directly which typically may include parallel interfaces such as printer ports and interfaces for digital facsimile equipment. By comparison, in either of the above embodiments, the PGA is typically connected to other input-/output devices, via the serial ports, which are serially connected, such as conventional or limited-format keyboards, a modem, a bar code reader, or an optical scanner. Such devices are symbolically shown as 101 on FIG. 12. The barcode reader and its light pen can be used in conjunction with a service provided by a remote host, such as a catalog ordering service.

One skilled in the art will understand that the diagram as depicted in FIG. 12 is intended to be a functional depiction, and that in fact various principal components thereof such as the microprocessor 31, the PGA 32, the RAM 34, the EPROM 35a, and the FLASH-EPROMs 33, may all be connected by a conventional data bus 39. It is also within the skill of one skilled in the art to replace the EPROM and the FLASH-EPROMs with other memory capable of performing the same functions, such as a "silicon file" or a "battery-backed non-volatile readable and writable memory". In certain circumstances, a conventional RAM can perform some of the functions of the FLASH-EPROMs. Again, the key function of the present telephone-computer is that it can be capable of receiving and storing reconfiguration code preferably received over a telephone line or the like via a conventional port, so as to enable reconfiguration of the PGA as needed to update the hardware configuration of the system.

In the preferred embodiment, six levels of software are provided. They are the HAL application, the HAL operating system and interpreter, the Extended BIOS, the Kernel, the PGA reconfiguration code, and the system integrity code. Each level has different access capabilities, different storage requirements, and different uses. Certain software is stored in the FLASH-EPROMs. The primary FLASH-EPROM stores a HAL operating system and the HAL interpreter, the Extended BIOS, and the kernel. The secondary FLASH-EPROM stores a copy of the kernel and application pages. The application pages include the screens, instructions to collect data, and linkages to the prior screen and to the next screen.

The highest "level" of software in the telephoneemulating version of the system, is referred to as the "home application language" or "HAL" software. The HAL software is downloaded in "pages" from a network host computer in response to the user's indication that a particular service is to be accessed. If the user indicates that he wants to determine his checking account balance, typically by pressing a single button on the telephone-computer keypad or keyboard in response to a prompt, the telephone-computer sends an appropriate message to the network host, after which the network host computer 60 downloads an appropriate page of HAL software necessary to prompt the user to input his user code and the like. The HAL software when received by the telephone-computer is stored in the RAM 34 and normally is run immediately. Certain commonly used pages of HAL application software may also be stored typically in the secondary FLASH-EPROM in order to reduce the number of communications required to access the network host where this would appear useful. It is envisioned that on the order of 3-10 HAL pages might be typically downloaded to a terminal per day. The HAL software thus provides the information necessary to provide the desired user-friendly user interface, and is downloaded in response to the user's specific request. The HAL software is thus functionally comparable to IBM's Disk Operating System (DOS) software.

The second level of software is the HAL interpreter, which provides an environment for the HAL software to run.

The next level is "Extended BIOS". Extended BIOS software supports various functions shared by various pages of HAL software such as display control, preparation of messages to the network host, support of keyboard functions, and the like. Updated "multiapplication" Extended BIOS software can be downloaded from the network host computer when needed, a process which might take place on the order of several times per year. The updated Extended BIOS software will initially be received in the RAM 34 and will then be copied to the primary FLASH-EPROM for long term storage. It will be appreciated by those skilled in the art that Extended BIOS software provides functions which are employed by the HAL software and is essential for the HAL software to run properly.

The next lower level of software is the "kernel" which includes the non-extended BIOS. This kernel acts as an interface between the hardware and the HAL operating system. In the present invention, the kernel presents an IBM PC architecture to HAL with added integrity services to the HAL operating system. Like the Extended BIOS software the kernel can be downloaded from a network host computer when needed. A graphics display driver is integrated into the kernel stored in the primary FLASH-EPROM.

The memory map of FIG. 17 could be reconfigured by restructuring the BIOS and/or the Extended BIOS, depending upon the area of memory to be reconfigured.

The next lower level of software is the reconfiguration software or code which defines the state of the PGA. This is also referred to as "PGA code", "reconfiguration code" or "configuration code". Functions provided by the PGA chip programmed in accordance with the PGA code include functions which must be performed at high speed, such as memory control and timing, and parity checking with respect to various data communication paths, as well as providing the logic connecting the microprocessor to the RAM, ROM and input/output devices.

As in the case of the Extended BIOS software, any update to this reconfiguration code downloaded from the network host is initially stored in the RAM and then is copied to the secondary FLASH-EPROM and used to reconfigure the PGA chip as need be. For example, if it appears that a software virus is active, the PGA can be readily reconfigured such that the virus could n longer run on the telephone-computer. This would of course necessitate that other software including the extended or non-extended BIOS and possibly the HAL software be at least partially rewritten. However, these tasks can also be accomplished remotely.

The advantage gained from this remote programming capability is clear. For example, the PGA code could also be altered remotely if it were desired to add additional functions to the telephone-computer, such as adding a facsimile capability, magnetic or optical memory elements, or the like. In some cases it might also be necessary to reconfigure the PGA code to cure a flaw in the hardware design detected some time later. Again, each of these options substantially increases the utility of the telephone-computer.

As indicated above, the PGA code, having reconfigured the PGA chip, provides the foundation on which the BIOS software operates. Accordingly, the PGA chip must be configured properly for the various input/output functions controlled by BIOS to operate properly.

The final and lowest level of software is referred to as a "system integrity code". This software is written to the system integrity chip's EPROM 35a at manufacture or possibly to a separate ROM. It is this code which operates the system to the extent required to allow the reconfiguration software to be downloaded to the terminal in order to initially program the PGA chip as indicated above. Again, this software is essential in order that the PGA chip can be reconfigured by a reconfiguration code.

The above described software structure provides partitioning of the various elements of software according to their functions and their frequency and ease of access. The higher level software will be more frequently accessed. Similarly, the higher levels are variable in response to a user request (in the case of the HAL application) or relatively readily by the operator of the network host (in the case of the Extended BIOS software). Access to the PGA reconfiguration software will be restricted to the manufacturers or to a relatively small group of the system operators to prevent tampering of this highly significant software.

One important object of the present invention is to allow the user to access a bank data base. In order to avoid compromising the integrity of the data base, and to restrain fraudulent transactions or the like, the system must be made highly reliable. The capability of reconfiguring the actual logic of the telephone-computer substantially enhances this security. A hardware reconfiguration can be made at any time to support a change in the software desired, for example, to alter access requirements to prevent fraudulent users or to forbid them access to the data base. A number of specific changes can be made to prevent preexisting software from running on the telephone-computer. For example, data encryption could be made essential to all terminal-to-network host communications. Regular changes, e.g., once per month, could be instituted to prevent any "hacker" from obtaining access, for example, simply by regularly changing the encryption method used.

The primary microprocessor can also be programmed from a remote computer to recover from a system "lock-up" caused by a software error or other errors. If the mode while continuing operating as a conventional telephone. By depressing a specified sequence of keys on the keypad and/or keyboard, the code within the kernel provides a set of instructions which prompts the user for permission to recover. If permission is granted, the system dials a remote host computer to receive a recovery software module, including a new operating system.

If an updated software has a virus or other bug that prevents the telephone from connecting to the host computer, a numerical code may be keyed in through the keypad and/or the keyboard to force the unit in the "dumb" mode. The code to do this function is supplied to the user upon demand.

Figure 13:
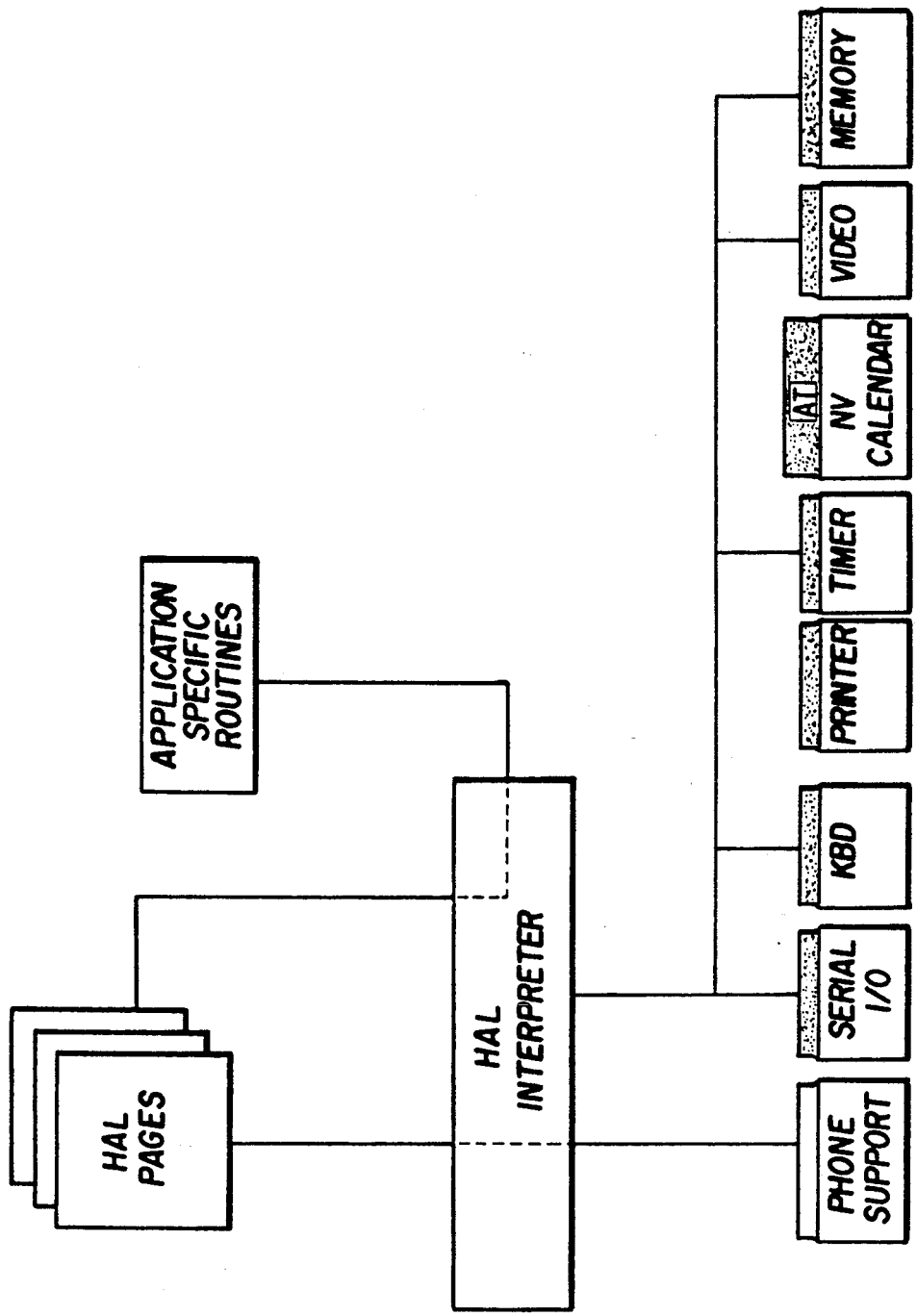
FIG. 13 depicts a system support overview of software functions of the primary microprocessor used in the telephone-computer.
Figure 14:
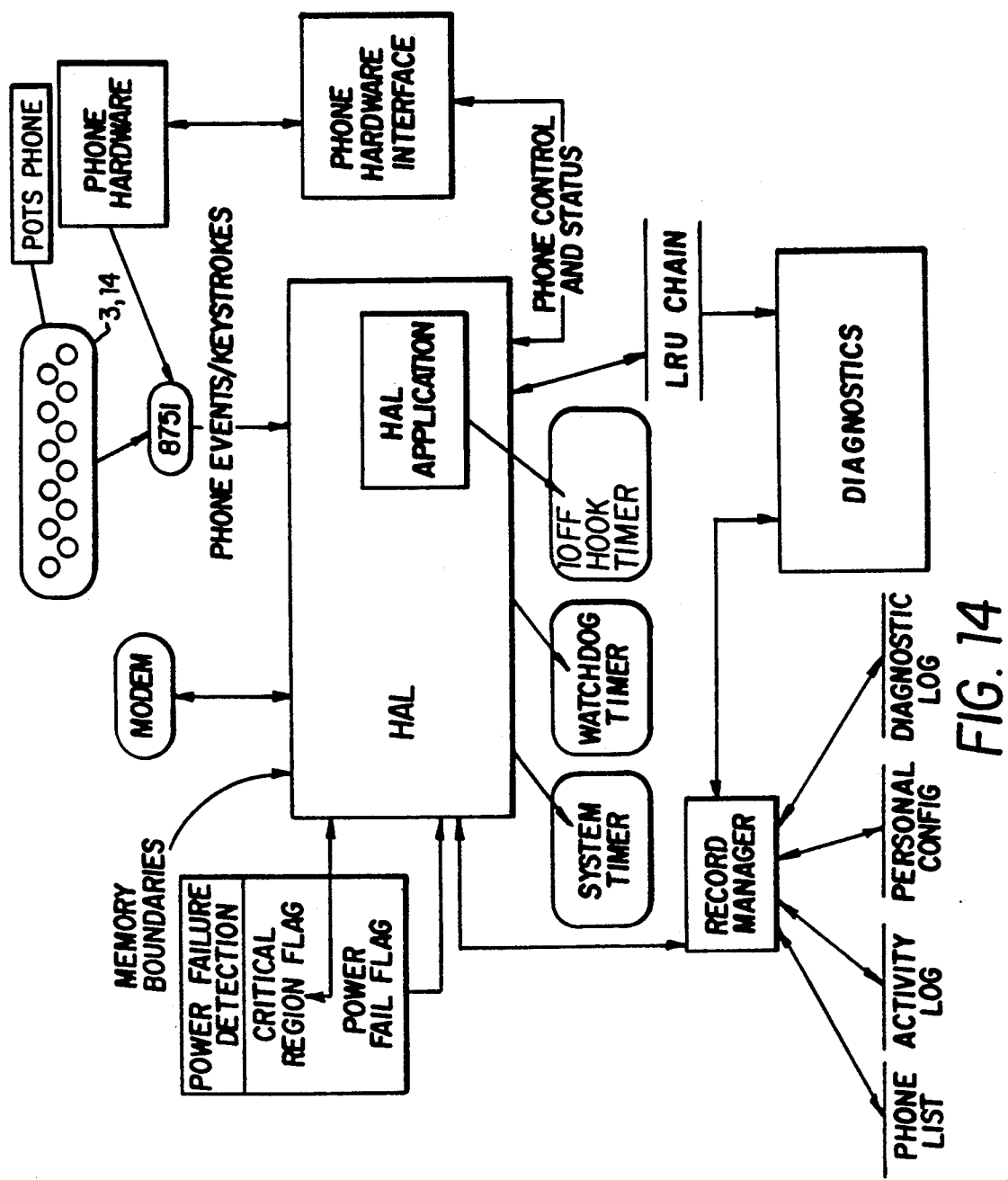
FIG. 14 depicts the primary microprocessor's software interface with a conventional telephone circuitry.

FIG. 13 sets forth an overview of certain software functions when the primary microprocessor of the telephone-computer is programmed in the HAL format. The primary microprocessor receives downloaded, compiled HAL software applications. These applications are interpreted by a HAL interpreter stored in the primary FLASH-EPROM. The initial HAL application pages, certain specific routines, customer data and/or configuration data may be written into the primary FLASH-EPROM so that they are protected against power failure. The HAL interpreter may also be downloaded from the network host computer when necessary, such as to update the interpreter, and stored in the primary FLASH-EPROM. Alternatively, all such data, except customer data, may be placed permanently in a ROM.

The primary microprocessor operating system defines certain microprocessor configuration parameters including the boundaries of the memory for the application pages as well as the data memory areas. The system software also provides that data pages may be written in the volatile memory. When the memory is filled and the primary microprocessor needs an additional page, the primary microprocessor transfers the new page from a network data bank and overwrites the pages which are least recently used. These overwritten pages may be retrieved from the network host memory through the modem, if required again.

The system software also provides input to microprocessor diagnostics and performs a power-on self test for the microprocessor. In one embodiment of the invention, the program invokes a record manager which manages a telephone list data record, activity logs, a personal configuration module and a diagnostic log. Certain elements of these records may be maintained in the FLASH-EPROMs to provide protection against power failure.

Referring to FIGS. 14-16 and 18, the telephone-computer support circuitry provides a number of integrity features. These include the following error detection or failure prevention features: (1) a determination as to whether the microprocessor software is functioning properly when the telephone is taken off-hook, (2) a watchdog timer to ensure that the computer software is not malfunctioning, (3) a parity check for the microprocessor's volatile random access memory (RAM), (4) FLASH-EPROMs or in an alternative embodiment, a battery back-up for the volatile RAM (5) circuitry to provide write protection for that memory, (6) power failure detection which interrupts the microprocessor when voltage drops below a threshold, (7) battery low warning, if a battery is used, (8) independent operation of the telephone electronics from the telephone line power so that when the A/C power fails, the telephone will continue to operate without termination of a call in progress, (9) a storage capacitor to provide backup power to the microcomputer device's real time clock, (10) circuitry to provide protection from the telephone line power overvoltage/overcurrent, (11) circuitry to protect from communication disruptions caused by a call-waiting signal or other disruptions of similar length, and (12) self monitoring functions to eliminate the need for service calls to repair malfunctions.

The integrity features are described in a greater detail as follows:

The telephone electronics includes an off-hook timer which, when armed, senses the removal of the handset from the telephone. The function of the off-hook timer is to ensure that the primary microprocessor software and hardware are functioning properly each time the telephone is taken off-hook. The off-hook timer is set to expire at the end of a period designated off-hook timer expiration (OHTE). If the timer expires, the telephone hardware will force the telephone electronics into a POTS mode (i.e., the telephone-computer operates as a normal telephone with a standard telephone speech network for a standard telephone voice transmission) and the microprocessor is rebooted. The POTS mode is activated through the telephone relay disable function which is activated by outputs from the off-hook timer and the primary microprocessor. If three consecutive attempts to reboot the microprocessor are unsuccessful, the telephone-computer remain in the POTS mode and a message is printed on the display. In one embodiment, a malfunction indication will appear as a service light on the telephone console. In an alternative embodiment, a malfunction indication will appear as either a message on the LCD display or the LCD display will appear with no backlighting.

The microprocessor includes a watchdog timer which is reset through the microprocessor's input/output bus. If, in the period designated watchdog timer expiration (WDTE), the watchdog timer is not reset by the primary microprocessor, a non-maskable interrupt (NMI) is generated as an input to the microprocessor. If the timer is allowed to expire a second consecutive time, a hardware reset is generated which disables the timer, decouples the telephone electronics from the microprocessor, reboots the microprocessor, and activates a service light on the housing unit. In an alternative embodiment, an error message appears on the display.

The microprocessor provides a parity check for the volatile RAM 34. The parity check function provides for an automatic recovery when there is a parity error. The parity check function provides the same type of NMI and failure protection as the watchdog timer. An automatic sequencing is provided to eliminate the need for a manual reboot. If no parity error is associated with the RAM, and there is a reboot caused by a hang-up in a non-memory component, the system will execute a soft reboot without the loss of memory.

The telephone-computer electronics provides power failure protection features. The primary microprocessor's power failure detection circuit is responsive to certain interruptions in power to the microprocessor or low power conditions and provides an interrupt to the microprocessor after receipt of the warning detections when certain thresholds are crossed. In response to these warnings, the primary microprocessor places itself in a condition for minimum disruption if a power failure occurs. The so-called "power fail" interrupt causes the microprocessor to enter a timed interval to finish current processing prior to entering the reset mode as long as the power low condition remains. In the event of a power failure, the POTS phone circuitry is activated so that a normal telephone operation is not disrupted.

The microprocessor circuitry derives power from 110 volt AC source, and the POTS phone circuitry is driven by 48 volt DC telephone line power. To permit both circuitries to function compatibly and independently within a single device, the microprocessor circuitry and the POTS phone circuitry are grounded separately.

Figure 18:
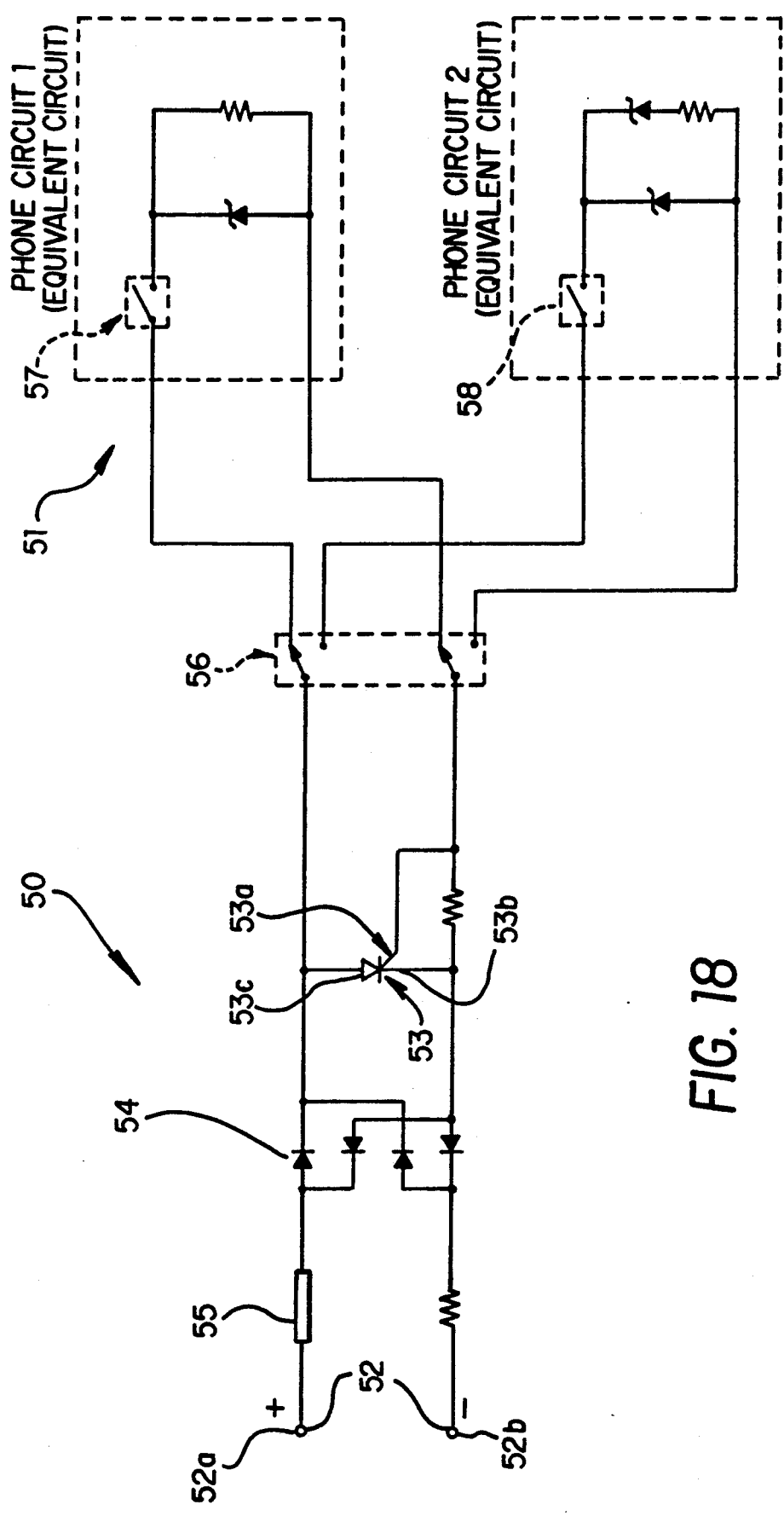
FIG. 18 is a diagram of an overvoltage and overcurrent protection circuitry utilizing a Surgector for the telephone-computer.

FIG. 18 is a diagram of the overvoltage/overcurrent protection circuitry 50 which disconnects the telephone circuitry 51 from the telephone line 52 in the event of a telephone line power overload and prevents the telephone from overheating. A fuse 55 is placed in tip line so that if a high voltage or a high current is applied, the fuse will disconnect the telephone circuit from the telephone line. However, in situations where a current is applied below the level in which the fuse blows, for instance during the UL1459 telephone inspection tests in which tests are run with a short-circuit current just below the blowing point of the fuse with a relatively low voltage, there arises situations where despite the relative low voltage, the applied current can cause dangerous heating in the telephone circuitry.

To prevent such situations, a Surgector, which is a silicon-controlled rectifier (SCR) device 53, is connected across a tip line 52a and a ring line 52b of the telephone line 52 to act as a current-triggered switch and at the same time to act as an overvoltage protector as well. That is, if a voltage greater than the breakover voltage of the SCR device, typically 295370 volts or higher, is applied across the tip and ring lines, for example during the UL1459 telephone testing, the SCR device will permit the current to pass through and between a cathode terminal side 53b and an anode terminal side 53c of the SCR device, thereby bypassing the telephone circuitry. When a relatively large current is applied to the tip and ring lines, an attenuated current will flow to a gate terminal side 53a of the SCR device. When the attenuated current reaches a trigger current level (150-300 mA), the SCR device will act as a closed switch to permit the current to pass through the SCR device instead of the telephone circuitry, thus providing an overcurrent protection for the telephone circuitry. The SCR device permits a normal telephone operation after the voltage drops below the threshold level or after the current passing through the cathode and anode terminals drops below the holding current threshold level (165 mA).

Since the SCR device operates under a DC voltage, a diode bridge 54 is connected between the ring and tip lines to convert an AC voltage, which is used during the UL1459 tests, to a DC voltage. Alternatively, the SCR device and the diode bridge may be substituted with a TRIAC device (two reverse-parallel SCR devices) since TRIAC devices operate with AC and DC voltages.

Figure 15:
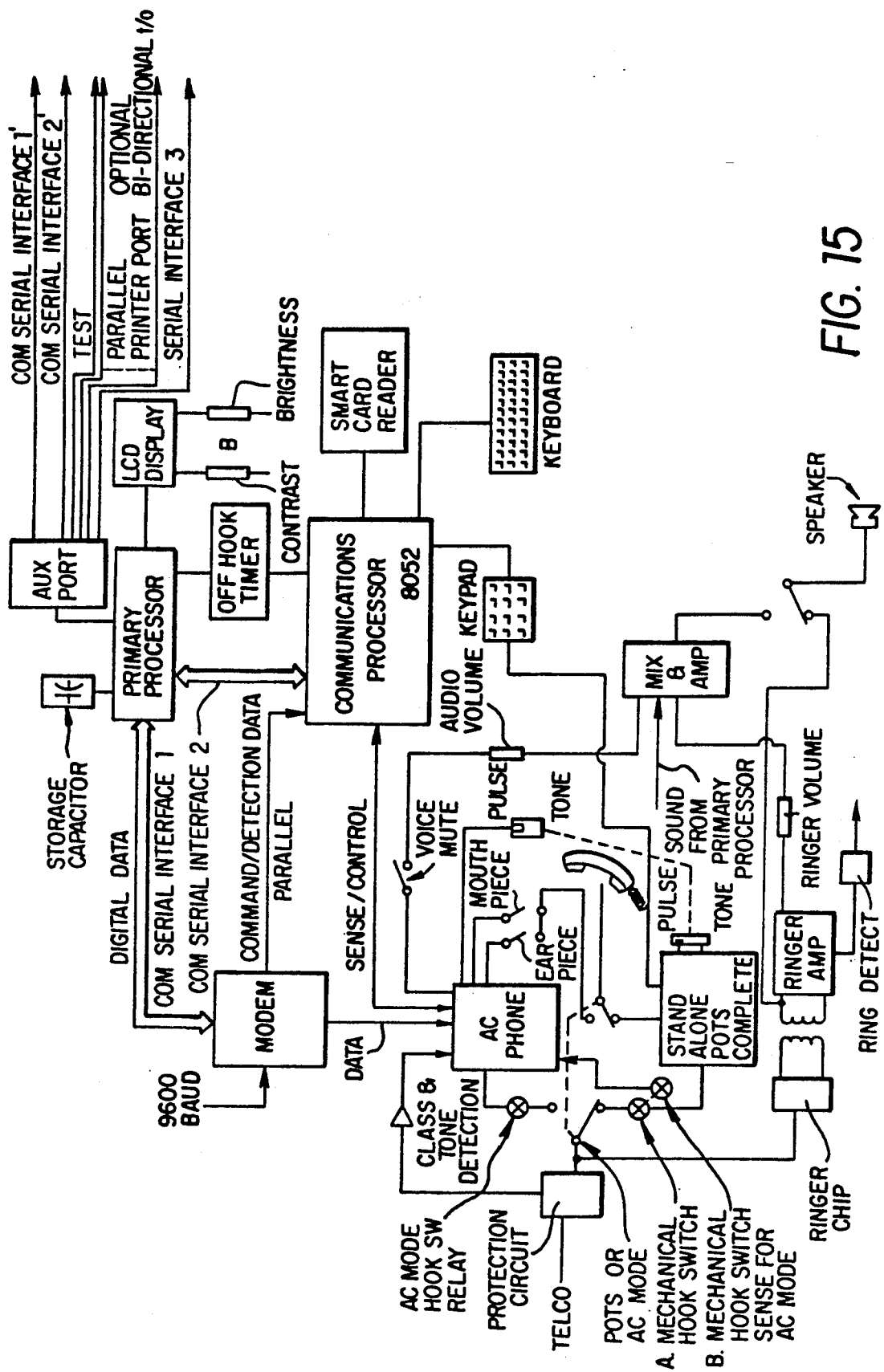
FIG. 15 is a functional diagram of the telephone electronics and related communications features of the telephone-computer.
Figure 16:
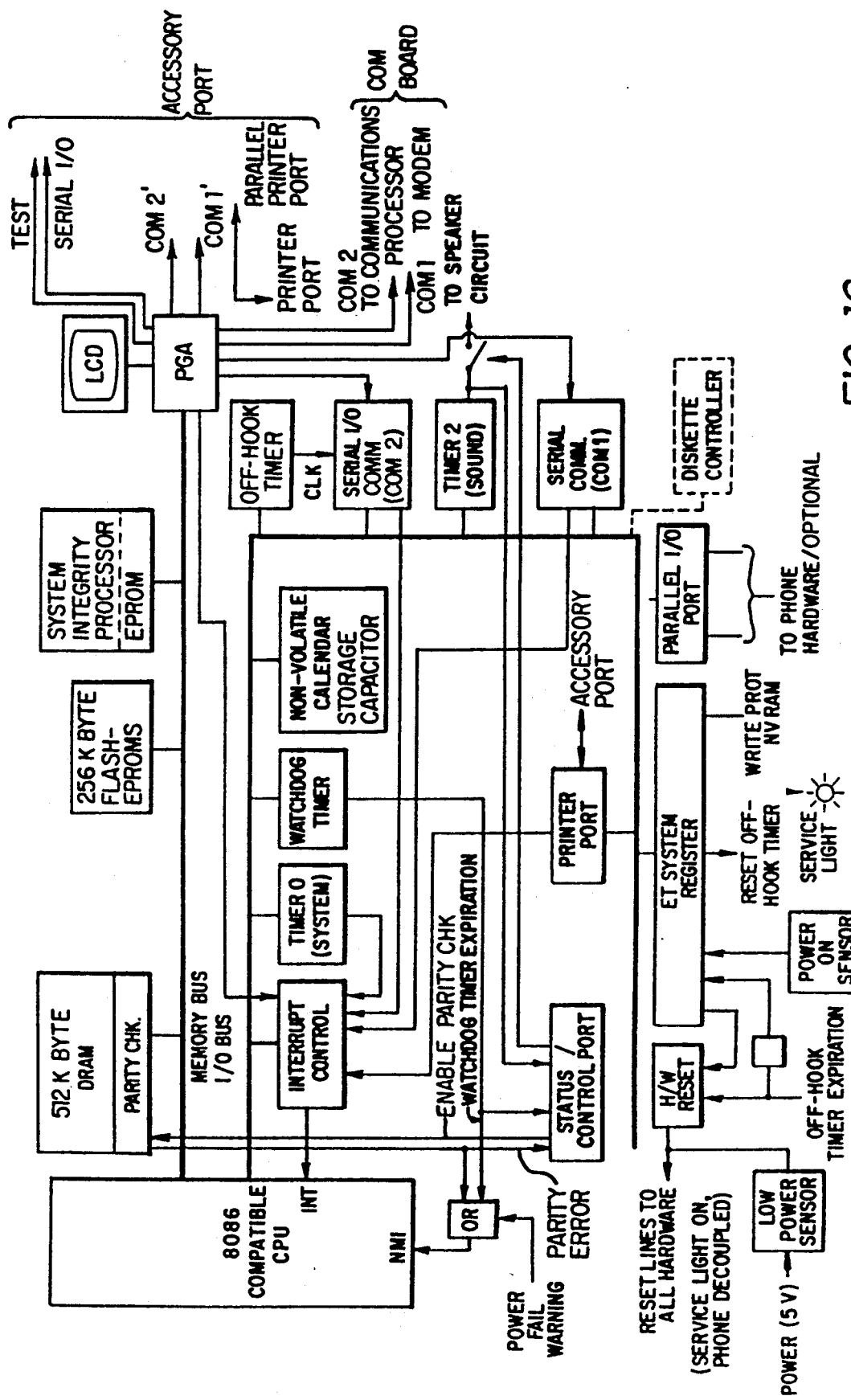
FIG. 16 is a functional diagram of the primary microprocessor, with input/output functions of the telephone-computer.

FIG. 15 is a block diagram of the telephone electronics of the invention. The 12-key telephone keypad includes a novel split pill output element which provides two separate isolated output signals. One output is directed to the keyboard/keypad communications processor, which passes to the modem dialer, and the other to the POTS telephone dialer. Both telephone dialers can provide pulse or tone dialing output to the telephone line. The dialers may be selected for either pulse or tone by a switch on the telephone housing or by software. The primary microprocessor has the capability of deactivating, under various conditions, the output of the telephone dialer to the telephone line so that data input by the user over the 12-key keypad does not interfere with standard telephone operations. The direct keypad, dialer telephone hook, and main telephone switch are all controllable from the primary microprocessor to permit the modem dialer to provide pulse or tone outputs or deactivate these outputs.

Specifically, one key on the 12-key keypad, usually the # key, acts a services key and may be designated a HELLO key. Activation of this key, when the telephone is on-hook, changes the primary microprocessor's control over the telephone from a monitoring mode to a controlling mode. The HELLO key feature provides computer enhanced telephone operation when the telephone is not connected to the network. The application on the primary microprocessor, in response to the HELLO key, typically provides a menu of microprocessor services, eliminates power to the telephone dialer (preventing unwanted dial tones from being transmitted to the network) and provides for transition of the telephone network to computer control.

In an alternative embodiment, a function key m ay be used in place of the HELLO key to obtain microprocessor control over the telephone.

Alternatively, any function key or the 12-key keypad may be programmed through the primary microprocessor for specific functions selected by the manufacturer. In the present embodiment, function keys for speed dial and re-dial may be provided. The device may include a key which performs the standard flush function of a telephone device. Alternatively selected keys of the 12-key keypad may be programmed to perform flash, speed dial, and re-dial functions.

The telephone electronics includes a communications processor which provides an interface between the 52-key keyboard or 12-key keypad and the primary microprocessor, organizes real time data to the primary microprocessor presented by either keypad, keyboard or related elements of the telephone electronics. The alternative embodiment disclosed in FIGS. 3 and 4 uses one or more function keys. The function key input is also provided through the communications processor. The interface circuitry and the primary microprocessor will support up to eight function keys.

In one embodiment, the communications processor also includes tone detecting hardware and software which can distinguish (1) busy or fast busy, (2) call-waiting, (3) ringing, and (4) dial tone, and passes this information to the primary microprocessor which in turn displays messages on the LCD display to inform the user of busy signals or other tones detected. In an alternative embodiment the modem performs these functions and passes the information to the primary microprocessor. The primary processor and communications processor have an established protocol to increase the integrity of the overall system. If the primary processor fails to hear from the communications processing unit within a preset time the system will reset, causing both processors to reinitialize.

The modem provides the modulator/demodulator circuitry necessary for transmitting and receiving data over a telephone network and thus forms the interface between the telephone line, the primary microprocessor, and the communications processor. The modem can also be configured to detect calling party data on the line and pass this data to the communications processor. The modem also includes circuitry to protect from disruptions in communications with other parts of a computer network. The ring and dial tones are also provided through the speech network to the telephone handset. The primary microprocessor provides a serial input to the modem which can be connected by control from the microprocessor to the main telephone line.

The modem will not automatically "retrain", as defined by the CCITT standard for V.32 modems, which is standard for 9600 baud modems, unless there is a disruption in the carrier signal transmitted from the remote computer of greater than 0.5 second duration. This feature provides protection from disruptions caused by the telephone network and disruptions caused by call waiting signals, and is transparent to the user. The modem circuitry used in the present invention is supplied by SGS Thomson.

The modem circuitry also includes the capability of detecting CLASS signals sent over the telephone line. The modem circuitry passes this information to the primary microprocessor to provide CLASS services. The CLASS services that can be provided by the invention include Automatic Callback, Automatic Recall, Customer Originated Trace, Calling Number Delivery and Calling Number Delivery Blocking. These services are discussed further in the Bellcore publications "CLASS Feature: Calling Number Delivery", Technical Reference TR-TSY-000031, Issue 2, June 1988, and "SPCS Customer Premises Equipment Data Interface", Technical Reference TR-TSY-000030, Issue 1, November 1988.

In one embodiment, the modem contains telephone dialing circuitry so that a separate dialer is not required and dialing of telephone numbers can be initiated from the keypad or keyboard, through the communications processor to the modem for dialing over the telephone line.

When the telephone-computer is powered-up, a self-integrity test and initialization is performed which verifies that all levels of operating software present in the telephone-computer are operational. These levels of operating software include the following modules: a system software comprising an extended BIOS and a BIOS parameter table; a system software interface, comprising Negative Call Page (NCP) Services; and a higher level software, comprising the HAL interpreter and applications. If the kernel, (which comprises the low-level BIOS), and the reconfiguration code and boot-up code are operational, it is possible to reload any of the mentioned modules over the telephone line in the event that the verification test fails. In the event that the kernel, which is stored in the FLASH-EPROMS, is corrupt, as the result of unforeseen or hardware failure, or if the terminal is being manufactured and has never been programmed, the enormous flexibility of the PGA allows the kernel to be reloaded through the auxiliary port 10 with the aid of an external PC.

The verification test is employed each time the telephone-computer performs a cold start, defined as a system reboot which follows a power-up, or warm start, defined as a system reboot with the power already turned on. The cold start verification sequence is identical to the warm start sequence except that during the cold start sequence the RAM is also cleared.

The initial step of the test comprises a kernel integrity test. This first step is performed by the permanently resident software in the telephone-computer, the system integrity software, stored in the one-time programmable EPROM 35a. The integrity software drives the system integrity processor. The integrity processor initiates a check of the main kernel and its backup copy, stored in the primary FLASH-EPROM 33a and the secondary FLASH-EPROM 33b, respectively. Each of the primary and secondary FLASH-EPROMs stores a copy of the kernel. If the backup copy of the kernel is corrupted, the main kernel will attempt to copy itself into the secondary FLASH-EPROM 33b. In the event that the main kernel is corrupt, a timer in the integrity processor will activate a physical swap of memory space between the primary FLASH-EPROM and the secondary FLASH-EPROM. The system will then be rebooted. If the backup kernel is operational, it will then attempt to copy itself into the primary FLASH-EPROM 35a.

In the event that the kernel software is corrupt, the integrity processor will initiate an external reprogramming process. The integrity software will allow an external PC to control the downloading of the reconfiguration code through the accessory port 10 on the telephone-computer directly to the PGA chip. This code will configure the architecture of the PGA so as to then allow the PC to route an image of the kernel directly to the primary FLASH-EPROM. This kernel will contain the software which is capable of configuring the PGA to its operable configuration, as well as the BIOS and other software necessary for the complete functioning of the system software. The PC will then cause the computer system to reboot.

Specifically, the system integrity processor 35, causes a first group of "system verification software" to be downloaded either from an external processor, such as the host network computer, or from a technician's test device, to reconfigure a portion of the PGA to resemble read-only memory containing certain predetermined microcode. This microcode is then used by the microprocessor 31 to test its own functions, which typically will include testing of the random access and read-only memory devices.

At this point, the microprocessor 31 can take over operations, and causes further reconfiguration code, the "operational reconfiguration code" (according to which the PGA chip 32 is configured to perform its ultimately desired functions) to be downloaded. This code is stored first in the RAM 34, then copied to the secondary FLASHEPROM, and is then used to reconfigure the PGA into its operational configuration, thus completing initial loading or test of the present telephone-computer. In the preferred embodiment, the "operational reconfiguration code" is stored in duplicate (in the primary FLASH-EPROM and in the secondary FLASH-EPROM). This allows the two versions to be compared to one another, providing an additional check on system integrity.

At this point, the telephone-computer will have two operational copies of kernel software. It can display to the user the message "I will be ready in a minute" and proceed to the next step of the verification process which consists of a self-diagnostic hardware test. If a hardware problem is found the verification process cannot continue. The user may then see a message instructing him or her to contact an appropriate service center for assistance.

Next, the remaining software modules in the primary FLASH-EPROM are scanned. The scan consists of checking that the size and check sum count of each software module coincides with the size and check sum count stored in the header of the module. In the event of failure, detected by the integrity process, the kernel will perform in a "dumb" mode and prompt the user with a question as to whether the system should be fixed. The display will show a message which requests permission from the user to call the host, whose telephone number is stored within the kernel. Upon affirmation, the telephone-computer will initiate a software recovery procedure.

The FLASH-EPROM recovery procedure comprises downloading recovery software and a flash memory map pertinent to the specific telephone-computer flash version number. The recovery software will rebuild FLASH-EPROM contents by investigating the FLASH-EPROMs in order to determine which modules are damaged or absent, and reloading those areas with new modules retrieved from the host. If the recovery process brings a newer version of the FLASH-EPROM modules, it will also update the FLASH-EPROM version number in the kernel data space.

There are two methods of updating the primary FLASH-EPROM. One method is to download an entirely new copy of the code on the FLASH-EPROM each time the chip is to be updated. A second method is to copy the contents of the FLASH-EPROM to the RAM and then erase the FLASH-EPROM code and download the new code from the RAM. After downloading, the parts of the FLASH-EPROM code stored in the RAM that have not been updated are copied back into the FLASH-EPROM. The choice of method depends on the complexity of the download. The choice of method also effects the integrity of the system. If there is a power failure while the FLASH-EPROM is being updated, the contents of the RAM is lost. When power is recovered the integrity processor will recognize that the code in the FLASH-EPROM has been corrupted and will ask the customer whether to begin the recovery sequence.

In addition to rebuilding the FLASH-EPROM modules, the recovery software will perform a purge of the diagnostic log stored in the primary FLASH-EPROM. The purge comprises clearing all data records which had been marked as deleted and compressing all the remaining valid records toward the beginning of their respective areas.

Upon completion of the recovery process, the recovery software will initiate a system reboot. At this stage, the operational system software (HAL) is validated and initialized. If successful, a portion of RAM will be cleared to serve as workplace for the BIOS and the Extended BIOS, watchdog and off-hook timers will be disabled, the interrupt vector table and transfer registers will be initialized and the NMI handler will be installed. Finally, control is passed to the HAL interpreter by invoking the BOOT interrupt and the HAL interpreter then starts up the HAL application.

The smart card reader reads inputs provided by a smart card, which contains a microprocessor and memory element, and passes this information to the communications processor. Included in the smart card reader circuitry are logic circuits to detect the presence of a smart card and to initiate reading the card. The smart card connects directly to the communications processor. No memory address is allocated for the smart card in the RAM (34), unlike other systems where a specific memory address is provided. The communications processor provides a low level connection between the card and the primary microprocessor. In an alternative embodiment, the smart card can be directly connected to the primary microprocessor and the PGA. In other words, the communications processor communicates with the primary microprocessor using the Extended BIOS, and also makes the card available to the HAL operating system. The HAL operating system then tells the application software that a card is present. The uses of a smart card include storage of operator-specific information, encryption data, and primary microprocessor memory update information.

The smart card reader also writes inputs received from the microprocessor onto the smart card. In one embodiment, data received from microprocessor is stored in the RAM and then written onto the smart card. If a power drop interrupts writing, the invention warns the user of a possible loss of data.

As previously described, a principal object of the invention is to provide a user-friendly terminal suitable for accessing a bank computer system operating various bank software programs, involving individual checking accounts and the like, and additionally providing a user-friendly method of accessing other service computers, such as those which provide airline reservation functions, stock table look-up functions, electronic bulletin board services, and a vast panoply of other such services, and which can also operate as a conventional telephone. Typically, in order to access such a diverse variety of services one must have educated oneself in a equal variety of terminal protocols and communication methods, which can be quite complex. Simply to keep track of the various user codes and access steps required to access each of these services is a substantial undertaking.

Figure 19:
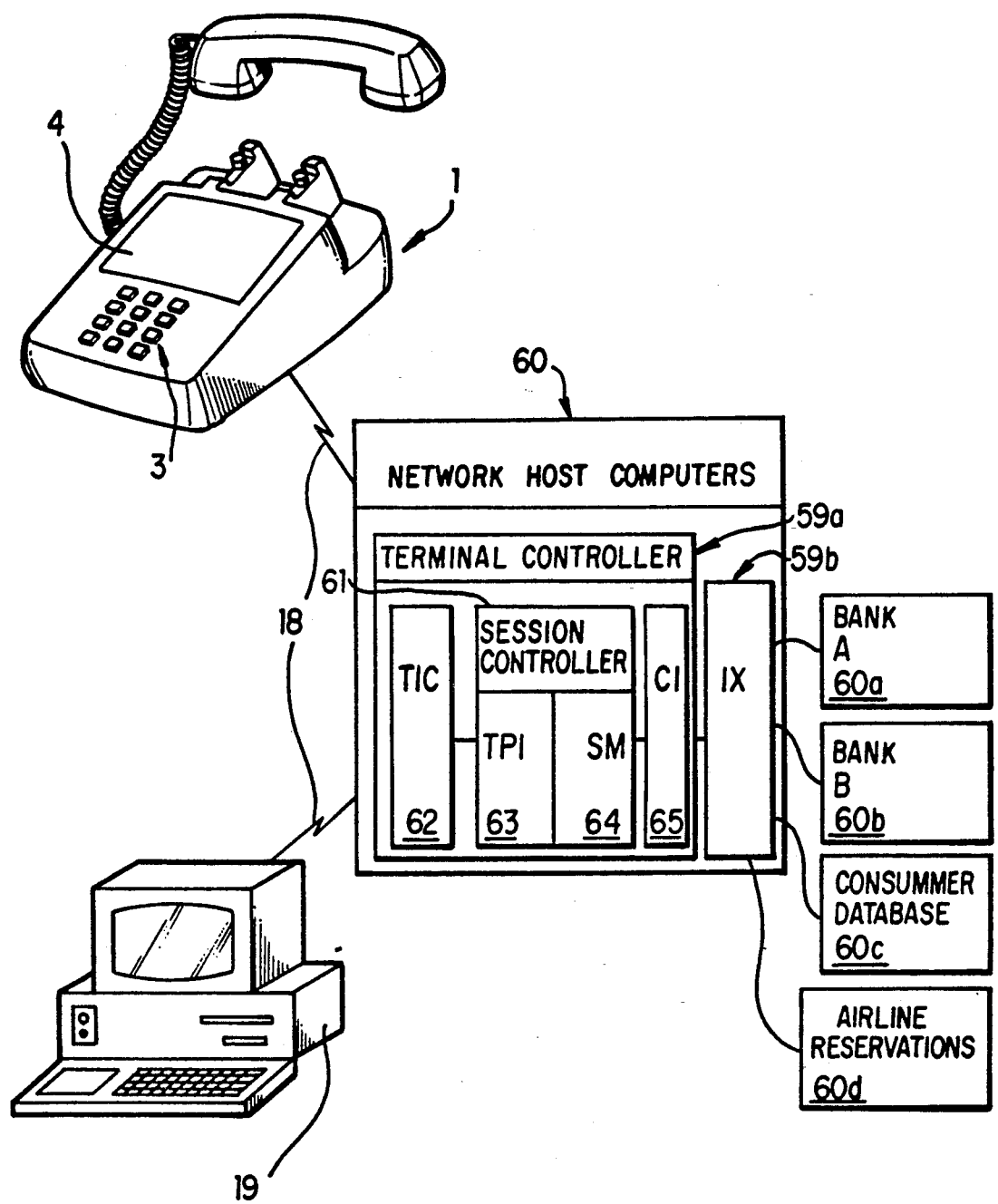
FIG. 19 shows an overall view of a distributed data processing system which is accessed by the telephonecomputer.

The present telephone-computer accesses a network host as described in copending application Ser. No. 433,825, filed Nov. 9, 1989, of which the present application is a C-I-P thereof. As shown in FIG. 19, each user is provided with the present telephone-computer 1, including the display 4 and the keypad 3 or an equivalent terminal 19 with a keyboard, which communicates via conventional telephone lines indicated generally at 18, with a network host computers 60. From hereafter, the term "terminal" shall mean the present telephone-computer 1 or a PC terminal 19. The network host computers include Terminal Controllers 59a and Interchanges 59b. The terminal controller comprise hardware and software and functions. One essential function of the network host computer 60 is to provide a series of application program "pages" which are downloaded to the terminal. The downloaded program pages supply the terminal with sufficient "prompts" to elicit from the user whatever information, i.e., user codes, desired transactions, and the like, required to access one of a plurality of service computers 60a-d to which the network host computer is connected via conventional telephone lines.

More particularly, suppose the user desires to access the service computer 60a of Bank A. When the user activates a terminal, there will appear on its display screen a menu allowing him to select "Access Bank Services" by pressing, for example, the numeral "3" button on the keypad 3 of the present telephone-computer or any other keys designated for such access in the terminal. If the user presses the button, the terminal will send a message to the network host computer which in turn consults its internal memory to locate an application program required to access the service computer 60a of Bank A and will download an appropriate program to the terminal. The terminal will in turn operate using this program and will ask the user various questions required to prompt the user to input the information needed to access his account at the bank, i.e., for example, his account number, his secret access code, the type of transaction desired, the amount of deposit, withdrawal, or transfer required, and so on. This information is then transferred from the terminal to the network host computer in a message having a first protocol. The network host computer transforms this information into whatever second protocol is conventionally required to communicate with the service computer 60a, for example in the precise manner in which automatic teller machines communicate. If on the other hand, the consumer desired to access Bank B, typically, the consumer will be asked the same questions by way of prompts, but the network host computer will transform the answers into a somewhat different protocol required to access the service computer 60b of Bank B. access an airline reservation host computer 60d, a somewhat different sequence of prompts would be provided by the terminal, using an appropriate different pages of application program software downloaded by the network host computer. Similarly, different communication sequences would occur between the network host computer and the airline reservation host computer 60d. The communication sequence and in particular the detailed format of the messages back and forth between the telephone-computer or equivalent terminal and the network host computer are described in detail below.

Communication between the network host computer 60 and the various service computers 60a-d takes place according to various second protocols defined by the proprietors of the services supported by the service computers. Implementation of these communications follows the techniques now in use with such preexisting service computers and is considered to be known by one skilled in the art.

It will be appreciated that the accessing of the various service computers 60a-d and countless others, requires that the network host computer be enabled to communicate according to a like variety of protocols. Typically, these will be implemented by IBM PC software programs. The terminal will therefore most conveniently also conform to the PC architecture. Further, as previously indicated above, it is an object of the invention that the telephone-computer be capable of running other PC-compatible programs. Again, "pages" of application software can be downloaded from the network host computer to the terminal in response to the user's selection of a particular service computer 60a-d.

The terminal controller 59a serves as a link between the terminal, and the interchange (IX) 59b serves as the link with a plurality of informational and financial service computer systems 60a-d. Notably, this is accomplished without modifying the software of the service computers 60a-d. Thus, an important function of the network host computer, the present telephonecomputer, and the HAL software which it runs is transforming the highly simplified "user-friendly" request/response sequence seen and responded to by the user (a menu) into a relatively complex communication sequence normally used to access the service computers 60a-d, and vice versa.

According to an important aspect of the invention, these menu choices are varied in accordance with the service selected by the user. That is, the user-friendly interface, comprising a "tree" of new menus is displayed sequentially and in response to each input provided by the user, until all information required to access the service has been specified, varies with the service. Provision of application programs page by page in response to the specification of a service according to the invention permits this flexibility, as it would be impractical to store all possible application programs in the telephone-computer.

The terminal controller 59a functionally comprises a terminal interface controller (TIC) 62, a session controller 61, and a common integrator (CI) 65. The session controller 61, in turn, controls the terminal protocol interface (TPI) 63 and a session manager (SM) 64. The TIC monitors the message flow between the telephone-computer and the TPI, and controls timers to cause timeouts when message traffic ceases. The TPI communicates with the telephone-computer and translates the protocol used by the telephone-computer when first establishing a connection with the network host computer. Additionally, the TPI generates random encryption key numbers when requested by the terminal. These encryption key numbers are used by the terminal program to transmit confidential information. The TPI also handles application page downloading requests.

The SM maintains the essential data needed for each communication session by storing information relating to the user of the terminal and the service computer system 60a-d which the user is accessing. All transactions performed between the terminal and the session controller during a particular session occur within the context of the specific consumer and the service selected, e.g., his bank or other financial institution. For example, after the consumer has been successfully established as a valid and authorized user, all message traffic to the particular terminal is thereafter considered related only to that consumer. This context determination, based on the consumer identification information, then allows the network host computer to access the correct service computer 60a-d for such items as account balances, and so on. The SM stores the contextual information required to validate the transaction and inserts it in messages passed to the CI when necessary. The SM also serves as the interface between the TPI, and the CI, which in turn serves as the communication link between the other elements of the session controller and the service computer systems 60a-d.

The user accesses one particular service network 60a-d by selecting the corresponding option, i.e. the desired service, from a menu displaying the possible choices on the terminal display. Communication between the terminal, the session controller, and the selected service computer 60a-d then begins with a session establishment and protocol selection phase.

During the session establishment and protocol selection phase, the terminal connects to the network host computer through the standard telephone line 18. After the connection has been established, the telephonecomputer sends a series of signals by which the session controller sets such parameters as the communication baud rate. For example, after the network host computer sets the communication baud rate, it responds with a terminal type inquiry. The terminal interprets this signal as a request to identify the type of terminal in use and responds with an ASCII code identifying the type of home terminal being used, i.e. the telephone-computer or a PC terminal.

The network host computer provides the important function of allowing the present telephone-computer to mimic a conventional microcomputer running essentially conventional communication software. Therefore, the service computer 60a-d receives communication in precisely the same "service computer communication protocol" which it conventionally receives. Accordingly, the service computers need not be modified in any way for communication, which is essential in achieving the objects herein. As indicated, such conventional microcomputer systems 19 may also be interfaced to the service computers 60a-d by way of the network host computer according to the present aspect of the invention. In such a case, the network host computer will again respond to a request for access to a service computer 60a-d by downloading one or more "pages" of application software, user prompts, etc., allowing the conventional microcomputer 19 to conveniently access the service computer 60a-d.

Figure 20:
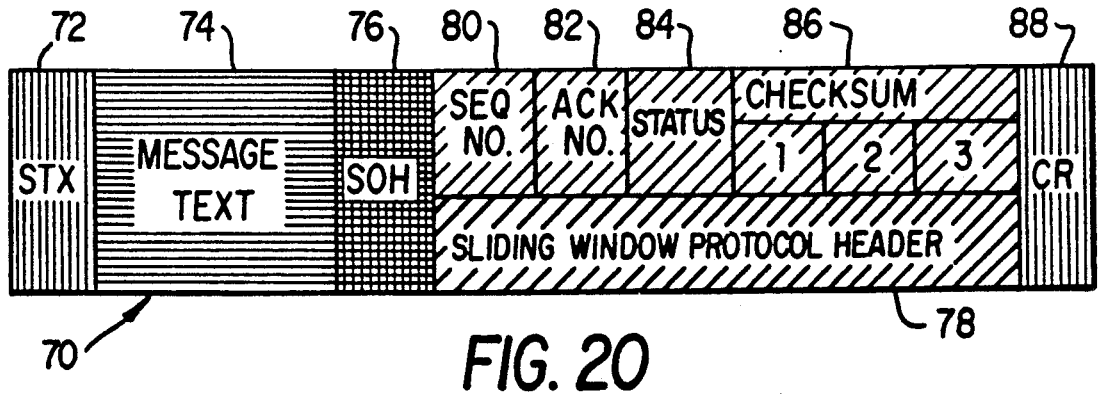
FIG. 20 shows a diagram of the message format employed according to the processing system of FIG. 19.

After a communication session has thus been established, a "link level" protocol is employed between the terminal and the session controller. In the link level protocol, all communications between the terminal and the network host computer are formatted into information packets called messages. FIG. 20 shows the basic format of the message 70. This message format is used for the majority of the messages sent between the network host computer and the terminal. Other related formats are used in special cases discussed below.

Each message 70 begins with a one-byte start of text (STX) delimiter 72 which consists of the fixed HEX code "02". The next field of the message, the message text field 74, can contain up to 256 bytes of transaction information. It is within this message text field 74 that the actual transaction information is transferred. The message text field 74 can also contain information concerning the status of the message.

Following the message text field 74 is a one-byte start of header (SOH) delimiter 76 which has a fixed HEX value of "01". This SOH delimiter 76 signifies the end of the message text field 74 and the start of the Sliding Window Protocol Header 78.

The Sliding Window Protocol Header 78 is provided according to an important aspect of the present invention, and contains control and error management information. This header 78 comprises a sequence number field 80, an acknowledge number field 82, a status field 84, and a checksum field 86, totalling six bytes in length.

The sequence number field 80 is important to the error detection and control system employed according to the invention. This field contains a sequence number assigned by the transmitting device (i.e. either the telephone-computer or the network host computer) to each message sent. More specifically, the sequence number field 80 contains a one-byte ASCII encoded number from 0 to 9 specifying the order of the message 70 in a series of transmitted messages. The sequence numbers are assigned independently to the messages sent in both directions. Each successive message 70 is assigned a reference number one greater than that of the preceding message 70. The sequence numbers are applied in a cyclical fashion. That is, when sequence number 9 has been assigned to a message, the next message is assigned sequence number 0. This process is referred to as the "sliding window protocol" used for error detection and correction according to the invention.

The receiving device stores the sequence number of the message most recently received. When a new message is received, the receiving device determines if the content of the sequence number field 80 is one greater than the sequence number of the preceding message received. If not, an error has been detected, and the receiving device directs the transmitting device to resend the preceding message.

Additional security is provided by use of the checksum field 86, which is written to the message by a transmitting device. This checksum value is compared with the checksum count as determined by the receiving terminal. If the checksum value is correct and the sequence number is in the proper order, the message is considered to have been received in good condition.

The acknowledgement number field 82 of each message contains the sequence number of the last message received in good condition. Until this acknowledgement number is received, the transmitting device stores the messages in a buffer for possible retransmission. If the transmitting device has stored one or more messages with higher sequence numbers than the last received acknowledgement number, those messages with a greater sequence number are retransmitted. Correspondingly, when an acknowledgement number is received, all stored messages having sequence numbers less than or equal to the last received acknowledgement number are discarded. This sequencing and acknowledgment method allows for the continuous flow of information without the delay associated with acknowledging each message before transmitting the next, and limits the amount of data which must be stored to implement this error correction arrangement.

It will be appreciated by those of skill in the art that sliding window protocols of this general type, including use of sequence numbers and acknowledgement of messages, are generally known to the art. See generally, Tanenbaum, Computer Networks (Prentice Hall, 1981), esp. §4.2, "Sliding Window Protocols", pp. 148-164.

There is, however, one limitation on this continuous flow of messages. Because the range of reference numbers is finite, the maximum number of messages which can be sent without repeating a reference number is 10. Accordingly, if all the sequence numbers available in the finite range 0-9 have been assigned to unacknowledged messages, the transmitting device ceases message transmissions and sends an immediate acknowledgement request in a null message, that is, a message which contains no information in its message text field, but which has a sequence number equal to that of the preceding message. The receiving device recognizes a null message by its repetition of the preceding sequence number. A null message is thus used to convey control information such as an immediate acknowledgement request.

Figure 21:
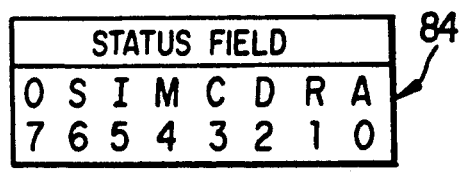
FIG. 21 shows a status field of the message according to the processing system of FIG. 19.

The status field 84 is a one byte (eight bit) field which informs the receiving device of the status of the message and provides a medium for various control requests. FIG. 21 details the bits of the status field 84. Bits 7 and 5 are always set to zero and one, respectively, so that the value of the complete status byte 84 is in the range of 32 to 127. Hence, the value of the status field can be represented by the ASCII codes for print characters, which is convenient for diagnostic purposes. Bit 6 indicates the transmission channel over which the message is travelling. A value of 0 in bit 6 represents a foreground, or high priority, transmission channel, and a value of 1 in bit 6 indicates use of background, or low priority, transmission channel. Bit 4 is used to inform the receiving computer whether the response is contained in more than one message and that there is at least one more message to come which is related to the response contained in the present message. A value of 0 in bit 4 indicates that the present message is the last or only segment in a response while a value of 1 in bit 4 informs the receiving computer that the present message is the first or an intermediate segment of a multi-segment response.

Bit 3 distinguishes normal session messages from connect messages used when communications are first established between the terminal and the network computer. A bit 3 value of 0 represents a normal data message, while a bit 3 value of 1 signifies a connect request or response. Similarly, bit 2 indicates whether a message is a normal session message or a disconnect request, in which 0 indicates a normal session message and 1 requests a disconnect.

Bit 1 is set to a value of 1 to request retransmission of all unacknowledged messages, i.e., messages with a higher reference number than the acknowledgement number of the message containing the retransmission request. A 0 value in bit 1 indicates a normal message.

Bit 0 is set to a value of 1 to request acknowledgement from the receiving computer. This signal would be sent, for example, in the situation explained above, in which the sending computer has used all of the reference numbers and requires an acknowledgement before sending any more messages. A 0 value in bit 0 indicates a normal message.

The checksum field 86 as indicated above contains a bit count or similar value calculated by the sending device. The same calculation is performed by the receiving device and compared to the stored value to confirm that the message has been correctly received. Finally, the message 70 concludes with a carriage return (CR) 88.

According to the invention, when one of the devices involved in a communication session sends a message 70 containing either an acknowledgement request, an acknowledgement response, a retransmit request, a connect request or a disconnect request, there may be no transaction data to be transmitted in the message text field. Hence, this information is sent through a null message, including a repeated reference number as described above. This informs the receiving computer that any transaction data that may be contained in the text field is to be ignored and that the header information only is to be read. Of course, it is not necessary to send a null message for the above mentioned requests and responses. Instead, a normal message may be used which sends the request or response information, while transaction information is sent in the text field. Null messages are sent when a normal message is not available and an acknowledgement has been requested, or when the maximum number of messages is outstanding, and no more normal messages may be sent.

Figure 22:
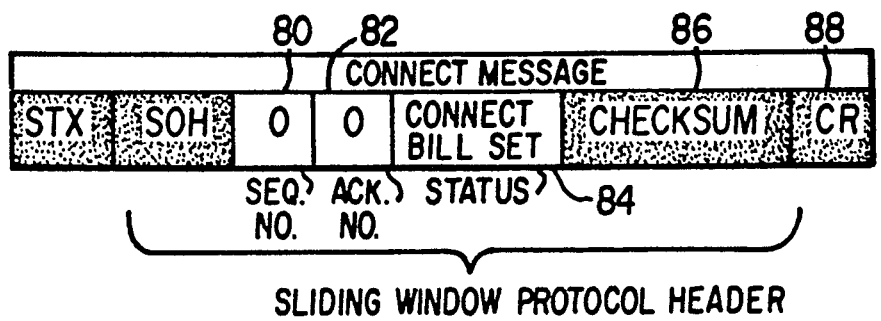
FIG. 22 shows a connect message according to the processing system of FIG. 19.

In establishing a communication session, the terminal sends a connect request message, as shown in FIG. 22. When the session controller returns a connect response, shown in FIG. 23, the session is established and all subsequent communications proceed using the message format as discussed above. At the beginning of each session, a series of messages (shown in FIGS. 26 and 27) are exchanged to determine whether the application pages resident in the terminal are current versions. All out-dated application pages in the user terminal are replaced by current versions which are downloaded to the terminal, page by page, as need be, using the predefined message format. Updates are made only with respect to the application page(s) specific to the service of current interest to the user. This reduces the delay experienced by the user, while eliminating any requirement that all users have the same versions of each application page.

Because some transactions available through the network services involve individual financial accounts, an exchange of user verification messages is employed in these cases to ensure against unauthorized manipulation of consumer accounts. When the user has indicated his intention to perform a financial transaction or other transaction requiring access to a secure database, the TPI (63) instructs the terminal via a downloaded page to send a request for an encryption key. The TPI returns a randomly generated key. The smart card in the telephone-computer uses this key to encrypt the consumer's personal identification code (PIC), that is, a code indicating his right to access the secure database. The encrypted PIC is then transmitted to the network host computer in a user verification message. Similarly, any other secure information may be encrypted at any time during a session if the terminal program includes instructions for sending additional encryption messages. Each time a key is requested, a new encryption key is generated.

After the user verification stage is complete, the consumer may perform various transactions with the informational and financial service computer systems. Such transactions can take a variety of forms, as will be understood by those of skill in the art.

Once the page updating procedure has been completed as necessary and the terminal is loaded with the application pages necessary to access the service the consumer desires, the consumer can effect transactions with service providers. Operations then proceed in a simple and straightforward manner. The consumer is prompted by software downloaded to the terminal, as needed, to provide any additional input required, and the appropriate message is sent by the terminal to the service computer which actively accesses the database, bank records, etc., involved. Again, according to the invention, the terminal provides a user-friendly interface, and the network host computer translates user's responses to prompts, sent by the terminal to the network host computer in a first format, into the format conventionally employed to access the particular service computer 60a–d providing the service desired.

In general, it is desirable that the prompts be sufficiently definite that the user can input all required instructions using only the 12 keys of a telephone keypad responsive to prompts which are updated in response to the sequence of prior responses. This greatly simplifies use of the system, and contributes substantially to the user friendliness which is a goal of the invention. However, in some cases it may be necessary to provide all 26 alphabetic keys as well, e.g. to spell out airline destinations. In such cases, the small keyboard 14 sliding out of the housing of the telephone-computer is used.

If the consumer wishes to use a service for which the telephone-computer has not stored the application pages, an explicit request message can be sent for the necessary pages. This capability clearly provides unprecedented flexibility in provision of network access to users operating simple, low-cost, user-friendly terminal devices.

The following provides additional exemplary details of typical message formats and communication sequences according to the invention. Other communication sequences, as needed, are within the skill of the art, given the disclosure provided by this application.

When a communication session between the terminal and the network host computer has been established and both devices are prepared to communicate in the link level protocol message format as shown in FIG. 20, the terminal computer sends a connect request message as shown in FIG. 22. The connect request message contains no information in the message text field, but the connect bit, bit 3 of the status field 84 of the sliding window protocol header (see FIG. 21), is set to 1. The sequence and acknowledgment fields 80 and 82 as shown in FIG. 20 as set to zero, but the sequence number may begin as any number from 0 to 9.

Figure 23:
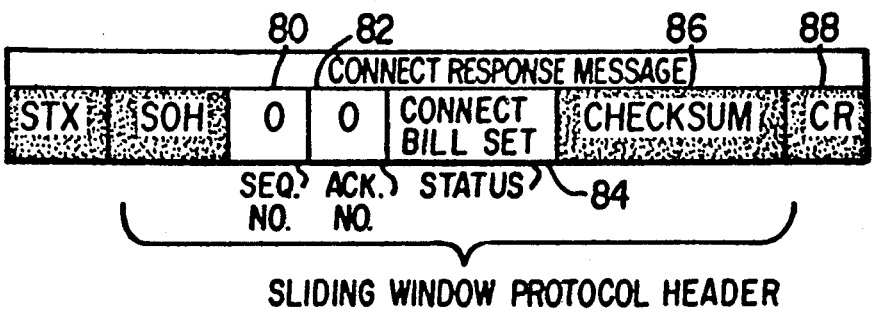
FIG. 23 shows a connect response message according to the processing system of FIG. 19.

When the network host computer receives the connect request message as shown in FIG. 22 from the terminal, it sends a connect message response as shown in FIG. 23. As with the connect request message, the connect bit in the status field 84 is set to 1. Although the sequence and acknowledgement fields 80 and 82 are again shown here as "0", the network computer echoes back, in the acknowledgment field 82 of the connect response message, the sequence number sent by the terminal in the connect request message. As noted, the network host computer may start the sequence with any number from 0 to 9. In its next message, the terminal will similarly include an acknowledgement number equal to the sequence number of the connect response message. The other fields of the connect and connect response messages are as described above.

As discussed above, to ensure the availability of the most current software on the terminal, individual HAL pages resident in the terminal are updated as necessary. Superseded and outdated pages are purged, and revised versions replace earlier versions. As storage is limited in the telephone-computer, only the pages that are frequently used by the individual consumer are resident. Infrequently used pages can be provided by the network host computer when needed by the telephone-computer to access infrequently used network service providers. The updating process occurs at the beginning of each session, but page downloads can be requested at any time throughout the session, after the log-on process has been completed. The same communication process can be used to update pages normally stored in the terminal when necessary.

Current versions of all HAL pages are stored by the network host computer. When new versions are developed, the new pages are transferred to the data bank of the network host computer. The updated pages are transferred to the terminal page-by-page during normal communication sessions.

Figure 24:
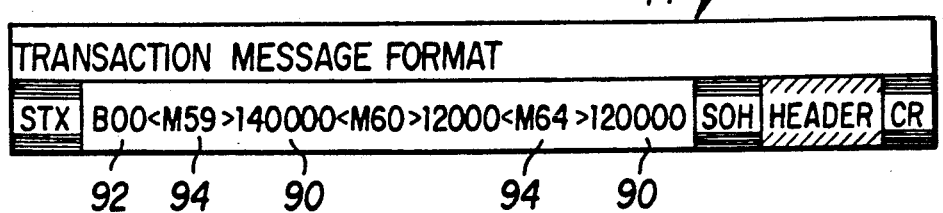
FIG. 24 shows a transaction message text format according to the processing system of FIG. 19.
Figure 25:
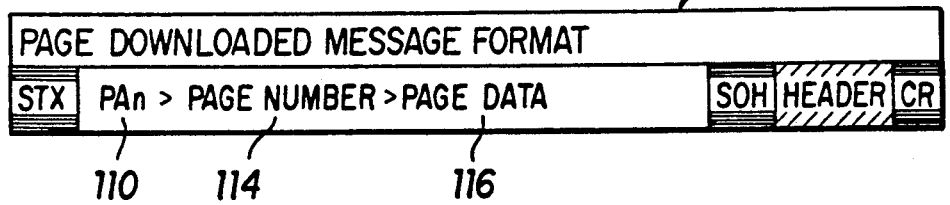
FIG. 25 shows a page downloading message text format employed according to the processing system of FIG. 19.

The format of the message text field of messages exchanged during the page downloading process is different than when used for transaction messages. FIGS. 24 and 25 illustrate the different formats used within the message text field 74 with respect to conventional transaction messages and page downloading messages, respectively. As shown in FIG. 24, the transaction message includes a transaction type code field 92. All transaction codes are three characters in length. The subsequent message elements 94 and 90 are identified by their element IDs in the text field.

More particularly, as shown in FIG. 24, the message text field 74 includes at least three sub-fields when used for sending transaction message text. The first field of the message text field 74 is a transaction type code 92. This is followed by one or more groups of two fields. Each group of two fields includes an element identification field 94, and the actual element data field 90. For example, when the service computer 60a–d selected requires a user identification number, and a request to this effect has been sent to the terminal by the network host computer, the terminal generates a message including a code in the element ID field 94, indicating that the subsequent element data field 90 includes the user identification number. Additional data, such as the user account number, can be included in the same message. Again, the account number would be located in an element data field 90, and would be preceded by an element ID indicating that the subsequent data field includes the account number.

This method of communicating data elements, by providing them in groups of two fields, specifying the element identification and the element date, is important to the efficient realization of the communications scheme according to the invention.

FIG. 25 shows the format of a page downloaded message. This format is used for downloading pages of HAL software from a network host computer to the individual terminal. For example, suppose the terminal is used to initiate a communication session in response to a user's pressing a key identifying the initial request for access to a service computer 60a-d, the initial request for access to a service will be interpreted by the network host computer to specify the HAL application page to be used to access the service computer. If necessary, the network host will download the latest version of that page using the downloading message text format as shown in FIG. 25. This text is stored in the message text frame 74 of the overall message as shown in FIG. 20.

The downloading message text format commences with a transaction type code field 110 in which is provided in alphabetic transaction code indicating, for example, that the subsequent data is a page of a HAL application program. This is followed by a page number field 114 which includes the page number of the following page of software, or other identification data needed. Finally, the actual application software page needed by the terminal is provided in a page data field 116.

Figure 26:
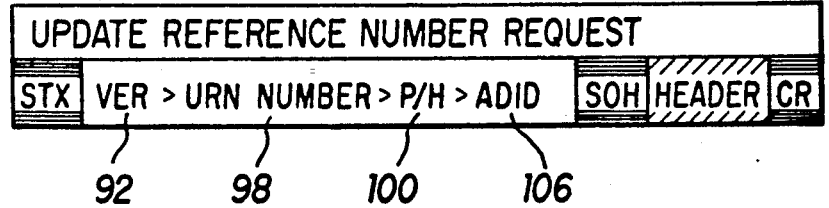
FIG. 26 shows a page update request message according to the processing system of FIG. 19.
Figure 27:
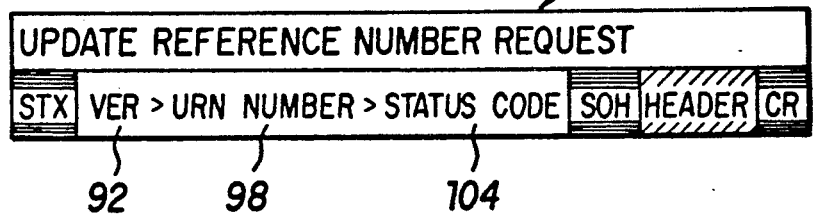
FIG. 27 shows a response to the page update request message of FIG. 26.

The following description of FIGS. 26 and 27 provides more detailed views of the way in which the terminal and network host computer determine that an update of a particular terminal software is necessary. As noted, to ensure that the terminal does not utilize outdated application pages, each session begins with a page update exchange. These are exemplary of transaction text messages, and will provide to those of skill in the art sufficient information to implement the other communications necessary to effect the functions of the invention. Other necessary messages generally follow the same format. Their detailed functions and implementation are considered to be within the skill of the art.

The terminal sends an update reference number (URN) request message following the receipt of the connect response message. Referring to FIG. 26, the URN request message is a normal message containing the URN coded request in the message text field. The URN request begins with a transaction code 92, shown here as VER. Thus, the data field 74 in this request message comprises the highest page number 98 of the application pages stored in the terminal at the beginning of the present session.

The URN messages also specify in a field 100 marked P/H, the type of terminal being used. This information is important in determining the priority used in sending update information. The final data field 106 includes the terminal ID.

The network computer responds to the URN request message of FIG. 26 with a URN response message as shown in FIG. 27. The transaction code 92 (VER) is repeated. This repetition of transaction codes is used in all transaction messages in order for the receiving device to determine the request message to which a given response applies.

The next data field 98 in the URN response is the highest URN for the current application pages stored in the network computer. The final data field is a 2 digit status code 104 which the network host computer informs the user terminal whether page updating is necessary.

If the terminal URN is lower than the network computer URN, page updating is necessary. The network host computer accumulates the list of pages that have new versions from a cross reference file, employing the terminal URN and the network host computer URN.

An immediate send flag is provided which is set to "1" for pages related to particularly significant functions such as log-on or the main menu displayed to the user. These pages are downloaded prior to sending the URN response message, that is, immediately upon establishment of the session. If any of the pages have an Immediate Send flag set "1", they are put at the top of the download file. The pages with the flag set to "1" are put in a zero length transaction file.

If during the session, following the page update process, the consumer wishes to use a service for which the terminal does not have the necessary pages, an explicit page request can be sent.

It will be appreciated by those of skill in the art that there have been described several important and unique aspects of the system of the invention. Of particular importance in allowing a user friendly home terminal system to be employed with a variety of service computers is the concept of providing a network host computer which receives relatively simple requests from the terminal, and responds to these with requests for any additional data required, together with screen commands and the like, such that the terminal can readily prompt the user to provide whatever additional data is needed. In this way the "intelligence" of the network host is effectively combined with that of the user terminal to generate all information required to access the various service computers. This limits the amount of communication between the user and the service computer to a minimum, which is important in reducing the cost of the service to the consumer.

The use of the network host computer to update the software comprised by the terminal page by page also has great significance, in that in this way the terminal can be provided with many additional capabilities, while remaining a relatively inexpensive and compact unit and retaining the "user-friendly" appearance which is highly desirable. Furthermore, this capability allows access to further services to be provided in the future without requiring any physical modification of the terminal. The "sliding window" error detection and correction scheme is also highly useful in realizing the objects of the invention.

The use of the standardized message format discussed above, in which varying numbers of individual data elements can be communicated back and forth between the terminal and the network host computer, simply by specifying the identification of the element, is also of great utility, inasmuch as this greatly simplifies communication between the terminal and the network host and renders this communication relatively flexible. At the same time, use of the same overall message format for all messages, including both data items such as user identification numbers and software such as downloaded pages, further simplifies the communication scheme provided according to the invention.

The foregoing description is only illustrative of the principle of the present invention. It is to be understood that the present invention is not to be limited to the exact construction as illustrated and described herein. All expedient modifications which may be made within the scope and the spirit of the present invention are to be encompassed herein.

We claim:

1. A telephone with a remotely programmable memory and computing ability and having a simplified user interface comprising:

a microprocessor means having a remotely programmable logic means defining interconnections among the components of the microprocessor means and associated memory, said microprocessor means being responsive to inputs from a standard telephone keypad and instructions maintained in said memory to perform computing and control functions, said telephone incorporating electronics for a telephone dialer, and said keypad also providing output to said telephone dialer.

2. A telephone as set forth in claim 1 wherein the telephone electronics provide standard telephone functioning when power is disconnected from the microprocessor means.

3. A telephone as claimed in claim 1 wherein the microcomputer means drives a display device.

4. A telephone as claimed in claim 2 wherein the microprocessor means and memory are connected to a telephone line through a modem.

5. A telephone with a remotely programmable memory and computing ability and having a simplified user interface comprising:

a microcomputer means having a remotely programmable logic means defining interconnecting among the components of the microprocessor means control with associated memory, said microcomputer means being responsive to inputs from a standard telephone keypad and instructions maintained in said memory to perform computing and control functions, said telephone incorporating electronics for the operation of telephone service, said microprocessor means also responsive to inputs provided from said telephone electronics and providing control of said telephone electronics, and said memory incorporating both volatile and nonvolatile elements so that said microprocessor means and said memory may be programmed as a general purpose computer.

6. A telephone as claimed in claim 5 further comprising:

a lapse timer means resets by output from said microprocessor means, said timer means providing an interrupt to said microprocessor means unless reset by said microprocessor means within the predetermined time, and said microprocessor means being rebooted and said timer means being disabled unless said timer means is reset within a second predetermined time interval.

7. A telephone as claimed in claim 5 further comprising:

detector means for detecting an off-hook condition on the handset of the telephone, timer means responsive to said off-hook detector means and said microprocessor means to reboot said microprocessor means if said timer is not reset by said microprocessor means within a predetermined time interval.

8. A telephone as claimed in claim 5 further comprising:

a parity check means for at least a part of said memory, and logic means responsive to said parity check means to provide an interrupt to said microprocessor when said parity check means provides an error detection.

9. A telephone as claimed in claim 5 wherein said keypad provides simultaneous outputs to a telephone dialer and said microprocessor means through a dial output device.

10. A telephone as claimed in claim 5 wherein, said memory includes a removable memory element configured for permanent data storage even when removed from said microprocessor.

11. A combination computer and telephone comprising:

a housing configured as a conventional telephone and having a front panel consisting essentially of a telephone keypad and a display;

telephone electronics responsive to said telephone keypad and including a telephone dialer within said housing for performing conventional telephone functions; and a microprocessor within said housing, including associated memory, said microprocessor being responsive to inputs from said conventional telephone keypad and to instructions contained in said memory for performing computing and control functions such that is is capable of interacting over a telephone line with a host computer to transfer information between data bases ion or accessible through the host computer and the combination computer and telephone.

12. The combination computer and telephone claimed in claim 11 further comprising means external to the combination computer and telephone, for programming said memory.

13. A combination computer and telephone comprising:

a housing configured as a telephone, having a front panel consisting essentially of a display device and a telephone keypad operating a dual output device, microprocessor means in the housing connected for receiving input from the dual output device, telephone electronics in the housing connected for receiving input from said dual output device, a memory for receiving input from said microprocessor, a telephone dialer receiving input from said memory, a switch means to select the telephone electronics when there is a power failure to said microprocessor, and a modem to connect said telephone dialer and memory to an outside telephone line.

14. A combination computer and telephone as claimed in claim 13 further comprising instructions resident in said memory for controlling said microprocessor.

15. A combination computer and telephone as claimed in claim 13 further comprising a removable memory.

16. A combination computer and telephone as claimed in claim 13 further comprising:
   a lapse timer means reset by output from said microprocessor means,
   said lapse timer means providing by interrupt to said microprocessor means unless rest by said microprocessor means within a first predetermined time interval, said microprocessor means being rebooted and removing power from said telephone electronics and said lapse timer means being disabled unless said lapse timer means is reset within a second predetermined time interval.

17. A combination computer and telephone as claimed in claim 16, further comprising an off-hook detector means for detecting an off-hook condition of said telephone handset mounted on said upper mounting structure, off-hook timer means responsive to said off-hook detector means and said microprocessor means to roboot said microprocessor means and remove power from said telephone electronics unless said off-hook timer is not reset by said microprocessor means within a third predetermined time interval.

18. A combination computer and telephone as claimed in claim 13, wherein a parity check means for at least a part of the associated memory of the microprocessor means and logic means responsive to said parity check means provides an interrupt to said microprocessor means when said parity check means provides an error detection.

19. A telephone as claimed in claim 1 or 5 further comprising a second keyboard.

20. A telephone as claimed in claim 1 or 5 further comprising a second hidden keyboard.

21. A combination computer and telephone as claimed in claims 11 or 13 further comprising a second keyboard.

22. A combination computer and telephone as claimed in claims 11 or 13 further comprising a second hidden keyboard.

23. A telephone as claimed in claims 1 or 5 wherein said keypad is a touch screen input device.

24. A telephone with a programmable memory and computing ability and having a simplified user interface, comprising:
   a microcomputer including a microprocessor means having a reconfigurable gate array means and associated memory means, said microprocessor means being responsive to inputs from a standard telephone keypad and instructions retained in said memory means to perform general computer functions,
   said memory means comprising both volatile and non-volatile memory elements, thus enabling said microcomputer to operate as a general purpose computer; and
   telephone electronics, including a dialer, for operating standard telephone functions,
   said microprocessor means being also responsive to inputs provided from said telephone electronics and providing control of said telephone electronics.

25. A telephone comprising:
   a housing for retaining therein standard telephone electronics and computer components, said standard telephone electronics including a telephone dialer and performing standard telephone functions;
   said computer components comprising a microcomputer including microprocessor means having a remotely reconfigurable gate array means and associated memory means for storing instructions for said microprocessor means;
   display means driven by said microprocessor means;
   a modem for communicating with remote computers via telephone lines;
   a telephone keypad for selectively providing inputs to said telephone dialer and to said microprocessor means,
   whereby said microprocessor means is responsive to inputs from said keypad and instructions in said memory means to function as a computer.

26. A telephone according to claim 24 or 25, wherein said telephone electronics permit standard telephone operation when power is disconnected from said microcomputer.

27. A telephone according to claim 24, wherein said microprocessor drives a display means.

28. A telephone according to claim 27, wherein said microcomputer includes a modem means for communicating with a remote computer.

29. A telephone according to claim 25 or 28, wherein said microcomputer accesses a network host computer via said modem means, said network host computer communicating with information and financial services in formats used by said services, said gate array means being remotely configurable by programs transmitted from said network host computer, said programs conforming to a format in which said microprocessor means understands, thereby enabling said microcomputer to communicate with said information and financial services which use formats that are incompatible with said microprocessor means.

30. A telephone according to claim 29, further comprising:
   a watchdog timer means which is resettable by signals from said microprocessor means,
   said timer means providing an interrupt to said microprocessor means unless rest by said microprocessor means within a predetermined time limit, and said microprocessor means being rebootted and said timer means being disabled unless said timer means is reset within a second predetermined time limit.

31. A telephone according to claim 30, further comprising:
   detector means for detecting an off-hook condition of the handset of the telephone,
   timer means responsive to said off-hook detector means and signals from said microprocessor means for rebooting said microprocessor means if said timer means responsive to said off-hook detector is not reset by said microprocessor means within a predetermined time interval after detecting such off-hook condition.

32. A telephone according to claim 31, further comprising:
   a parity check means for at least a part of said memory means, and
   a logic means responsive to said parity check means to provide an interrupt to said microprocessor means when said parity check means provides an error detection.

33. A telephone according to claim 24 or 25, wherein said keypad provides simultaneous inputs to said dialer and said microprocessor means through a dual output device which is connected to said keypad.

34. A telephone according to claim 24 or 25, wherein said memory means includes a readily detachable and portable read/write memory element configured for permanent data storage even when disconnected from said microcomputer.

35. A telephone according to claim 34, wherein said detachable and portable memory element is a smart card.

36. A telephone according to claim 24 or 25, further comprising a keyboard for inputting instructions and data to said microprocessor means.

37. A telephone according to claim 36, wherein said keyboard is retractable from said housing for use, whereby said keyboard being hidden within said housing when not used.

38. A telephone according to claim 24 or 25, wherein said keypad further includes additional programmable function keys.

39. A telephone according to claim 24 or 25, further comprising an input/output port means.

40. A telephone according to claim 39, further comprising a bar code reader or an optical scanner attached to said port means, said microprocessor means being also responsive to inputs provided by said code reader or said scanner.

41. A telephone according to claim 24 or 25, wherein said reconfigurable gate array means controls logical connections between said microprocessor means, said memory means, and input/output devices.

42. A telephone according to claim 24 or 25, wherein said memory means includes electrically programmable non-volatile memory devices.

43. A telephone according to claim 24 or 25, further including a protection device for protecting said telephone electronics from damage caused by overvoltage and overcurrent in telephone lines.

44. A telephone according to claim 43, wherein said protection device comprises a bridge diode connected between a bridge line and a tip line of said telephone line to convert AC voltage to DV voltage, and a silicon-controlled rectifier placed between said ring and tip lines, which provides a protection against overvoltage as well as overcurrent.

45. A telephone according to claim 44, wherein said protection device further comprises a fuse connected to said tip line to further protect said telephone electronics.

46. A telephone according to claim 25 or 27, wherein said display means includes a touch screen for inputting instructions to said microprocessor means.

47. A telephone according to claim 25 or 28, wherein said modem means detects calling party data signals and passes said signals to said microcomputer.

48. A telephone according to claim 26, wherein said telephone dialer and said microcomputer are grounded independently to provide an independent and discreet telephone operation and an independent and discreet computer operation.

49. A telephone according to claim 25 or 28, wherein said modem means has means for detecting and distinguishing busy, call-waiting, ringing, dial, and redial tones, and means for displaying the detection to said display means.

50. A telephone according to claim 25 or 28, wherein said modem means has means for detecting calling party data signals and passing said signals to said microprocessor means.

51. A telephone according to claim 50, wherein said signals are CLASS signals provided by a telephone company.

52. A telephone according to claim 25 or 28, wherein said modem means has means for providing protection from an interruption in carrier signals over the telephone line and has means for automatically retaining when said interruption is greater than 0.5 second duration.

53. A telephone according to claim 24 or 25, wherein said microprocessor means having means to recover from a system "lock-up" caused by a softward error or other errors by depressing a specified sequence of keys on said keypad.

54. A telephone according to claim 24 or 25, wherein said microprocessor means is programmable at several different system levels.

55. A telephone according to claim 54, wherein said different system levels includes a softward which is downloaded in pages from a network host terminal, an interpreter to interpret such downloaded pages, a BIOS software which can be downloaded by an external computer, including such network host computer, programmable gate array code for reconfigurating said reconfigurable gate array means, and kernel software which is permanently resident in said memory means.

56. A telephone according to claim 25 or 28, wherein said microcomputer further comprises a communications processor which is logically connected to said modem means, said microprocessor means, and said keypad.

57. A telephone according got claim 56, wherein said microprocessor means further includes a system integrity processor with a ROM memory device which stores initial instructions for the microprocessor means.

58. A telephone-computer comprising:
a housing configured as a conventional telephone and having a standard telephone keypad, telephone electronics, and a microcomputer retained therein,
said telephone electronics, which includes a telephone dialer, being responsive to said keypad for performing standard telephone functions,
said microcomputer including a microprocessor means with associate memory means and a display means driven by said microprocessor means, said microprocessor also being responsive to inputs from said keypad and to instructions retained in said memory means for operating said microcomputer, and
said microprocessor means further including a remotely reconfigurable gate array means.

59. A telephone-computer comprising:
a housing configured as a telephone and enclosing therein telephone electronics and a microcomputer;
a keypad on said housing for operating a dual output device, whereby said telephone electronics, which includes a telephone dialer, receive said output signals from said dual output device,
said microcomputer having;
a memory means having a volatile memory means connected to said microprocessor means for receiving and storing instructions and a portable memory means which is readily detachable form said telephone computer, a reconfigurable gate array means which can be remotely programmed from an external computer; and a system integrity processor means with an associated ROM for storing an initial instructions for said microprocessor means, a communications processor for logically interfacing said keypad and said portable memory means, a switch means for selecting said telephone electronics when there is a power disconnect to said microprocessor means, and a modem means for communicating to computers in general via telephone lines, said modem means being logically interfaced with said communications processor and said microprocessor means, a display means which is driven by said microprocessor means, pp1 said microprocessor means also receiving outputs from said dual output device and said microprocessor means selectively providing inputs to said telephone dialer, whereby said microprocessor means is programmable by reconfiguring said gate array means via said modem means from another computer or said microprocessor means can be locally programmable either via said portable memory means or by a local programming means operatively connected to said gate array means.

60. A telephone-computer according to claim 58 or 59, wherein said telephone electronics permit standard telephone operation when power is disconnected from said microcomputer.

61. A telephone-computer according to claim 58, wherein said microcomputer includes a modem means for communicating with a remote computer.

62. A telephone-computer according to claim 59 or 61, wherein said microcomputer accesses a network host computer via said modem means, said network host computer communicating with information and financial services in formats used by said services, said gate array means being remotely reconfigurable by programs transmitted from said network host computer, said programs conforming to a format which said microprocessor means understands, thereby enabling said microcomputer to communicate with said information and financial services which use formats that are incompatible with said microprocessor means.

63. A telephone-computer according to claim 62, further comprising:

a watchdog timer means which is resettable by signals from said microprocessor means, said timer means providing an interrupt to said microprocessor means unless reset by said microprocessor means within a predetermined time limit, and said microprocessor means being rebooted and said timer means being disabled unless said timer means is reset within a second predetermined time limit.

64. A telephone-computer according to claim 63, further comprising:

detector means for detecting on off-hook condition of the handset of the telephone, timer means responsive to said off-hook detector mean sand signals from said microprocessor means for rebooting said microprocessor means if said timer responsive to said off-hook detector is not rest by said microprocessor means within a predetermined time interval following detection of an off-hook condition.

65. A telephone-computer according to claim 64, further comprising:

a parity check means for at least a part of said memory means, and a logic means responsive to said parity check means to provide an interrupt to said microprocessor means when said parity check means provides an error detection.

66. A telephone-computer according to claim 58, wherein said keypad provides simultaneous inputs to said dialer and said microprocessor means through a dual output device which is connected to said keypad.

67. A telephone-computer according to claim 58, wherein:

said memory means includes a portable memory means configured for permanent data storage even when disconnected from said microcomputer.

68. A telephone-computer according to claim 59 or 67, wherein said portable memory means is a smart card.

69. A telephone-computer according to claim 58 or 59, further comprising a keyboard for inputting instructions and data to said microprocessor means.

70. A telephone-computer according to claim 69, wherein said keyboard is retractable from said housing for use, whereby said keyboard being hidden within said housing when not used.

71. A telephone-computer according to claim 58 or 59, wherein said keypad further includes additional programmable function keys.

72. A telephone-computer according to claim 58 or 59, further comprising an input/output port means.

73. A telephone-computer according to claim 72, further comprising a bar code reader or an optical scanner attached to said port means, said microprocessor means being also responsive to inputs provided by said code reader or said optical sensor.

74. A telephone-computer according to claim 58 or 59, wherein said reconfigurable gate array means controls logical connections between said microprocessor means, said memory means, sand input/output devices.

75. A telephone-computer according to claim 58 or 59, wherein said memory means includes electrically programmable non-volatile memory devices.

76. A telephone-computer according to claim 58 or 59, further including a protection device for protecting said telephone electronics from damage caused by overvoltage and overcurrent in the telephone line.

77. A telephone-computer according to claim 76, wherein said protection device comprises a bridge diode connected between a ring line and a tip line of said telephone line to convert AC voltage to DC voltage, and a silicon-controlled rectifier placed between said ring and tip lines, which provides a protection against overvoltage as well as overcurrent.

78. A telephone-computer according to claim 77, wherein said protection device further comprises a fuse connected to said tip line to further protect said telephone electronics.

79. A telephone-computer according to claim 58 or 59, wherein said display means includes a touch screen for inputting instructions to said microprocessor means.

80. A telephone-computer according to claim 58 or 61, wherein said modem means detects calling party data signals and pass said signals to said microcomputer.

81. A telephone-computer according to claim 60, wherein said telephone dialer and said microcomputer are grounded independently to provide an independent and discreet telephone operation and an independent and discreet computer operation.

82. A telephone-computer according to claim 59 or 61, wherein said modem means has means for detecting and distinguishing busy, call-waiting, ringing, dial, and redial tones, and means for displaying the detection to said display means.

83. A telephone-computer according to claim 59 or 61, wherein said modem means has means for detecting calling party data signals and passing said signals to said microprocessor means.

84. A telephone-computer according to claim 63, wherein said signals are CLASS signals provided by a telephone company.

85. A telephone-computer according to claim 59 or 61, wherein said modem means has means for providing protection from an interruption in carrier signals over the telephone line, and said modem has means for automatically retraining when said interruption is greater than 0.5 second duration.

86. A telephone-computer according to claim 58 or 59, wherein said microprocessor means having means to recover from a system "lock-up" caused by a software error or other errors by depressing a specified sequence of keys on said keypad.

87. A telephone-computer according to claim 58 or 59, wherein said microprocessor means is programmable at several different system levels.

88. A telephone-computer according to claim 87, wherein said different system levels includes a software which is downloaded in pages from a network host computer, an interpreter to act on downloaded pages, BIOS software which can be downloaded by an external computer, including said network host computer, programmable gate array code for reconfiguring such reconfigurable gate array means, and kernel software which is permanently resident in said memory means.

89. A telephone-computer according to claim 61, wherein said microcomputer further comprises a communications processor which is logically connected to said modem means, said microprocessor means, and said keypad.

90. A telephone-computer according to claim 89, wherein said microprocessor means further includes a system integrity processor with a ROM memory device which stores initial instructions for the microprocessor means.

91. A combination telephone and computer as defined in claim 11 wherein the keypad is operable to provide substantially all of the computing and control functions necessary for interacting over a telephone line with services provided by a host computer.

92. A combination telephone and computer as set forth in claim 12 including a full alphanumeric keyboard operably connected to the microcomputer and located in the housing hidden from the user's view and movable to a position where it is usable to control the microcomputer.

* * * * *